(12) United States Patent  
Zhu

(10) Patent No.: US 12,342,370 B2  
(45) Date of Patent: Jun. 24, 2025

(54) METHOD FOR DETECTING UNLICENSED CHANNEL, AND COMMUNICATION DEVICE

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 359 days.

(21) Appl. No.: 17/928,169

(22) PCT Filed: May 28, 2020

(86) PCT No.: PCT/CN2020/093054  
§ 371 (c)(1),  
(2) Date: Nov. 28, 2022

(87) PCT Pub. No.: WO2021/237624  
PCT Pub. Date: Dec. 2, 2021

(65) Prior Publication Data  
US 2023/0224956 A1    Jul. 13, 2023

(51) Int. Cl.  
*H04W 74/0808* (2024.01)  
*H04W 72/044* (2023.01)  
(Continued)

(52) U.S. Cl.  
CPC ..... *H04W 74/0808* (2013.01); *H04W 72/046* (2013.01); *H04W 72/542* (2023.01); *H04W 72/56* (2023.01); *H04W 74/085* (2013.01)

(58) Field of Classification Search  
CPC ............ H04B 7/06964; H04W 72/046; H04W 72/542; H04W 72/56; H04W 74/0808; H04W 74/085  
See application file for complete search history.

(56) References Cited

U.S. PATENT DOCUMENTS

| 11,653,373 | B2 * | 5/2023 | Hafeez | ................. H04B 7/0404 370/336 |
| 12,095,713 | B2 * | 9/2024 | Hafeez | ...................... H04L 5/18 |

(Continued)

FOREIGN PATENT DOCUMENTS

| CN | 107835516 A | 3/2018 |
| CN | 107919929 A | 4/2018 |

(Continued)

OTHER PUBLICATIONS

English Translation of CN 109496456 A; Mar. 19, 2019 (Year: 2019).*

(Continued)

*Primary Examiner* — Kashif Siddiqui  
(74) *Attorney, Agent, or Firm* — Cozen O'Connor

(57) ABSTRACT

A method for detecting an unlicensed channel is performed by a transmitter which performs a channel detection of unlicensed channel on a plurality of beams to be detected according to a channel detection mechanism of said beams. The channel detection mechanism includes an independent detection mechanism or a joint detection mechanism; in the independent detection mechanism, the channel detection parameter of each of said beams is independent; and in the joint detection mechanism, said beams have at least one associated channel detection parameter.

19 Claims, 20 Drawing Sheets

(51) Int. Cl.
*H04W 72/542* (2023.01)
*H04W 72/56* (2023.01)
*H04W 74/0833* (2024.01)

(56) References Cited

U.S. PATENT DOCUMENTS

2021/0058967 A1* 2/2021 Oteri ................ H04W 72/23
2021/0345314 A1* 11/2021 Li .................... H04W 72/046

FOREIGN PATENT DOCUMENTS

| CN | 109496456 A | 3/2019 |
| CN | 110546899 A | 12/2019 |
| WO | WO 2018059512 A1 | 4/2018 |
| WO | WO 2019136721 A1 | 7/2019 |

OTHER PUBLICATIONS

European Patent Application No. 20938178.9, Search and Opinion Dec. 19, 2023, 9 pages.
PCT/CN2020/093054 English translation of International Search Report dated Feb. 25, 2021, 2 pages.

* cited by examiner

METHOD FOR DETECTING UNLICENSED CHANNEL, AND COMMUNICATION DEVICE

CROSS-REFERENCE TO RELATED APPLICATION

This application is the US national phase application of International Application No. PCT/CN2020/093054, filed on May 28, 2020, the entire contents of which are incorporated herein by reference for all purposes.

TECHNICAL FIELD

The present disclosure relates to a field of wireless communication technologies, and particularly to a method and an apparatus for detecting an unlicensed channel, a communication device and a storage medium.

BACKGROUND

With the increase of mobile devices and the rapid development of mobile Internet, mobile data are increasing explosively. On the one hand, higher requirements are needed for traffic density, network capacity, user rate, and time delay. In order to cope with these challenges, a brand new air interface design for a 5th-generation (5G) mobile communication new radio (NR) is made aiming at a new scene and a new frequency band. On the other hand, spectrum resource shortage is increasingly severe for a mobile communication network. Licensed frequency bands, and more specifically, low-band resources with a higher value, are not only limited in bandwidth, but they are also rapidly consumed by increasing user groups. In order to cope with the challenge of spectrum shortage, a system capacity is increased, and a mobile network may be deployed on an unlicensed frequency band. Although unlicensed frequency band resources are rich, in order to ensure fair coexistence between different radio access technologies (RAT) using the frequency band, a Listen Before Talk (LBT) technology based on Clear Channel Assessment (CCA) is introduced into Licensed Assisted Access (LAA), and it is an important way to ensure fair coexistence to introduce a listen before talk (LBT) into new radio based unlicensed access (NR-U).

In the related art, a transmitter may support a mechanism for simultaneous data transmission on a plurality of beams mainly applied to a licensed frequency band. In an unlicensed frequency band, when a transmitter supports simultaneous data transmission on a plurality of beams, because the transmitter needs to perform a channel detection before transmitting data, it remains an unsolved problem how the transmitter performs channel detection on different beams.

SUMMARY

According to a first aspect of the present disclosure, a method for detecting an unlicensed channel is provided, and includes:
performing channel detection for unlicensed channel on a plurality of beams to be detected based on a channel detection mechanism of beams to be detected;
in which, the channel detection mechanism includes an independent detection mechanism or a joint detection mechanism; a channel detection parameter of each of the beams to be detected is independent in the independent detection mechanism; the plurality of beams to be detected have at least one associated channel detection parameter in the joint detection mechanism.

According to a second aspect of the present disclosure, a communication device is provided, and includes:
a processor;
a memory configured to store instructions executable by the processor;
wherein the processor is configured to: implement the method as described in any above embodiment when running the executable instructions.

According to a third aspect of the present disclosure, a non-transitory computer storage medium stored with computer executable instructions is provided. The computer executable instructions implement the method as described in any above embodiment when executed by a processor.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following exemplary embodiments do not represent all implementations consistent with embodiments of the present disclosure. Rather, they are merely examples of apparatuses and methods consistent with some aspects of the disclosure as detailed in the appended claims.

The terms described in the embodiments of the present disclosure are only for the purpose of describing specific embodiments and are not intended to limit the embodiments of the present disclosure. The singular forms "a", "the" used in the embodiments of the disclosure and the appended claim are also intended to include plural forms, unless the context clearly indicates otherwise. It should also be understood that the term "and/or" used in the present disclosure means and includes any or all possible combinations of one or more associated listed items.

It should be understood that, although the terms first, second, third, etc. may be used in embodiments of the present disclosure to describe various information, such information shall not be limited to these terms. These terms are only used to distinguish the same category of information. For example, subject to the scope of embodiments of the present disclosure, first information may also be referred to as second information, and similarly, and second information may also be referred to as first information. It depends on the context. For example, the word "if" as used herein may be interpreted as "in a case that" or "when" or "in response to determining".

Figure 1:
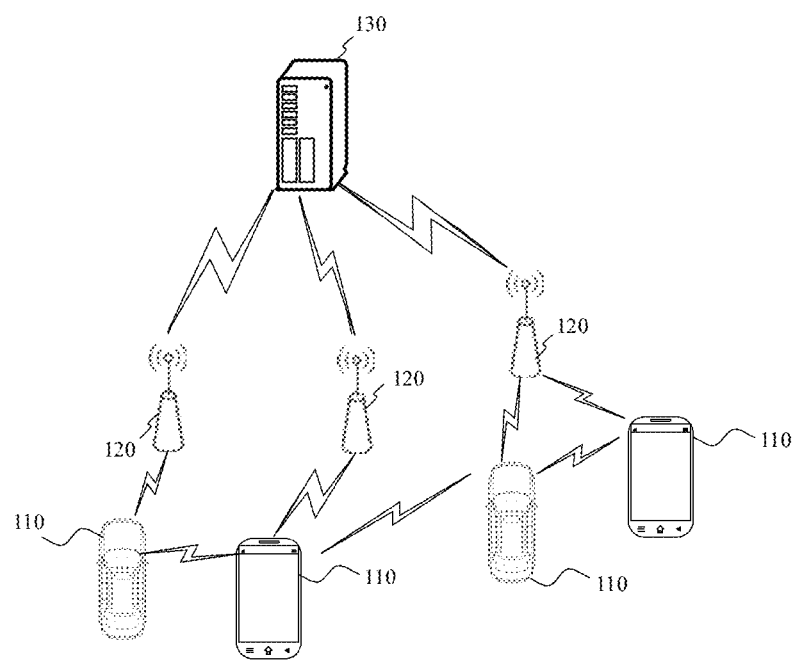
FIG. 1 is a diagram illustrating a structure of a wireless communication system.

FIG. 1 is a diagram illustrating a structure of a wireless communication system in embodiments of the present disclosure. As illustrated in FIG. 1, the wireless communication system is a communication system based on cellular mobile communication technology. The wireless communication system may include several user equipments 110 and several base stations 120.

The user equipment 110 may refer to an equipment that provides voice and/or data connectivity for a user. The user equipment 110 may communicate with one or more core networks through a radio access network (RAN). The user equipment 110 may be an internet of things user equipment, for example, a sensor device, a mobile phone (or referred to as a cellular phone) and a computer having an internet of things user equipment, for example, may be a fixed, portable, compact, handheld, computer built-in or vehicular apparatus, for example, a station (STA), a subscriber unit, a subscriber station, a mobile station, a mobile, a remote station, an access point, a remote terminal, an access terminal, an access terminal, a user terminal, a user agent, a user device or a user equipment (UE). Or, the user equipment 110 may be a device of an unmanned vehicle. Or, the user equipment 110 also may be a vehicular device, for example, may be a vehicle computer with a wireless communication function, or a wireless user equipment externally connected to a vehicle computer. Or, the user equipment 110 also may be a roadside device, for example, may be a street lamp, a signal lamp or other roadside device with a wireless communication function.

The base station 120 may be a network side device in the wireless communications system. The wireless communication system may be a 4th generation mobile communication (4G) system, also referred to as a long term evolution (LTE) system; or the wireless communications system may be a 5G system, also referred to as a new radio (NR) system or a 5G NR system. Or, the wireless communication system may be a next generation system of a 5G system. An access network in the 5G NR system may be referred to as a new generation-radio access network (NG-RAN).

The base station 120 may be an eNB adopted in the 4G system. Or, the base station 120 may be a base station (gNB) with a centralized-distributed architecture in the 5G system. When the base station 120 adopts the centralized-distributed architecture, it generally includes a central unit (CU) and at least two distributed units (DU). Protocol stacks at a Packet Data Convergence Protocol (PDCP) layer, a Radio Link Control (RLC) layer and a Media Access Control (MAC) layer are configured in the CU; a physical (PHY) layer protocol is configured in the DU. The specific implementation of the base station 120 is not limited in embodiments of the disclosure.

The base station 120 may establish a wireless connection with the user equipment 110 through a radio air interface. In different implementations, the radio air interface is a radio air interface based on a 4G standard; or, the radio air interface is a radio air interface based on a 5G standard, for example, the radio air interface is a new air interface; or, the radio air interface may be a radio air interface based on a next generation mobile communication network technology standard of 5G.

In some embodiments, an end to end (E2E) connection may be further established between user equipments 110. It may be applied to scenes such as vehicle to vehicle (V2V) communication, vehicle to infrastructure (V2I) communication and vehicle to pedestrian (V2P) communication in vehicle to everything (V2X).

The above user equipments may be referred to as terminal devices in the below embodiments.

In some embodiments, the wireless communication system may further include a network management device 130.

Several base stations 120 may be connected with the network management device 130. The network management device 130 may be a core network device in the wireless communications system. For example, the network management device 130 may be a mobility management entity (MME) in an evolved packet core (EPC). Or, the network management device may be other core network devices, for example, a Serving GateWay (SGW), a Public Data Network GateWay (PGW), a Policy and Charging Rules Function (PCRF) or a Home Subscriber Server (HSS), etc. The implementation of the network management device 130 is not limited in embodiments of the disclosure.

In order to facilitate the understanding of any embodiment in the disclosure, a channel detection mechanism involved in the disclosure is briefly introduced before an introduction of embodiments of the disclosure.

In a development process of the wireless communication system, for an unlicensed spectrum, a license assisted access (LAA) mechanism is proposed in 3GPP for using the unlicensed band. That is, a licensed spectrum is configured to assist the use of an unlicensed spectrum. In order to ensure coexistence with other systems such as a wireless fidelity (WiFi) on the unlicensed spectrum, a channel detection mechanism is also introduced in the LAA before data transmission, and a transmitter needs to detect whether the channel is idle when data needs to be transmitted, and can transmit data only when the channel is in an idle state.

The channel detection generally includes the following four categories:

A first category (CAT1, Category1): a Listen before talk (LBT) mechanism is not included, that is, a device directly transmits information without the need of detecting a channel before transmitting information. The LBT process may be referred to as a listen backoff mechanism configured to achieve effective sharing of the unlicensed spectrum. The LBT requires to listen to a channel for clear channel assessment (CCA) before transmitting information, and performs transmission when the channel is in an idle state.

A second category (CAT2, Category2): an LBT mechanism not including a random backoff process. The device performs channel detection on a set time unit before transmitting information, for example, the time unit may be 25 us. When a channel is detected idle within the time unit, the device can transmit information, or else, LBT fails to be executed, and the device cannot transmit information. The time unit may be a time slot.

Figure 2:
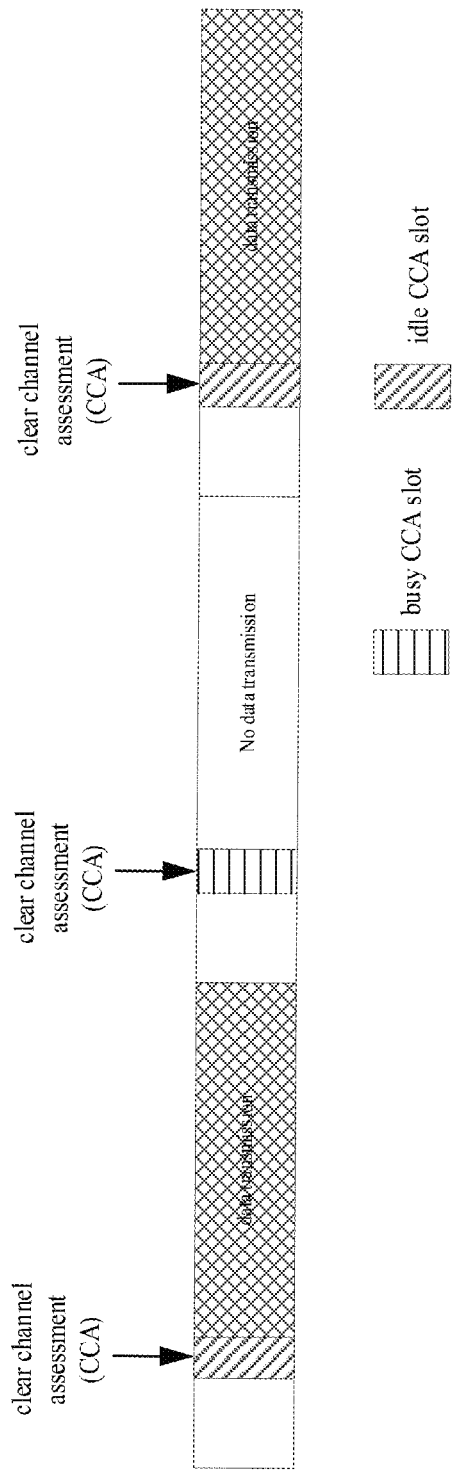
FIG. 2 is a diagram illustrating a detection of a channel detection category according to an example embodiment.

In one embodiment, as illustrated in FIG. 2, for a second category (CAT2) of channel detection mechanism, the specific process may be as follows. A wireless communication device performs CAA listening in one time slot. When the channel is detected idle within a CAA slot, the wireless communication device can immediately access the channel; when the channel is detected busy within the CAA slot, the wireless communication device can wait and listen again in a next CSS time slot, and immediately access the channel once the channel is idle.

A third category (CAT3, Category3): a random backoff-based LBT mechanism with a fixed contention window size (CWS). A transmitter detects whether the channel on the beam is idle at a first time granularity. When the channel on the beam is detected idle, a value N of a random number is selected within a first contention window, and channel detection is performed by taking a second time granularity as the time granularity. When the channel on the beam is detected idle at a second time granularity and a value of a random number is not 0, 1 is subtracted from the value of the random number, and channel detection is contingently performed by taking the second time granularity as the time granularity. When the channel on the beam is detected busy at the second time granularity, channel detection is performed by taking the first time granularity as the time granularity again. When the channel is detected idle again at the first time granularity, and the value of the random number is not 0, 1 is subtracted from the value of the random number, and channel detection is performed by restoring the second time granularity as the time granularity. It represents that an idle channel is occupied until the value of the random number is reduced to 0.

A fourth category (CAT4, Category4): a random backoff-based LBT mechanism with a variable contention window size (CWS). That is, on the basis of the third category, the transmitter may adjust a contention window size (CWS) based on a previous transmission result. For example, a ratio of data not properly received within data transmitted in a reference time in a previous transmission process is X. When X is greater than a threshold, the CWS value increases.

Figure 3:
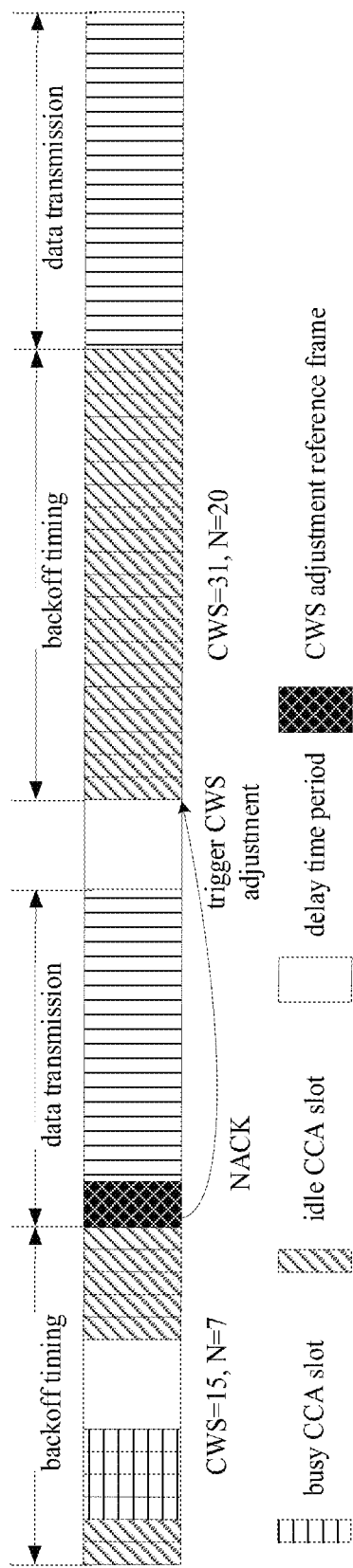
FIG. 3 is a diagram illustrating a detection of a channel detection category according to an example embodiment.

The fourth category CAT4 of channel detection mechanism is a random backoff-based CCA. The wireless communication device uniformly and randomly generates a backoff counter N between 0~CWS, and listens by taking a CCA slot as a granularity. The backoff counter is subtracted by one when the channel is detected idle within the CAA slot; otherwise, the backoff counter is suspended when the channel is detected busy, that is, the backoff counter N remains unchanged within the channel busy time until the channel is detected idle. The wireless communication device may immediately occupy the channel when the backoff counter is subtracted to 0. The contention window size (CWS) in the fourth category CAT4 is a dynamically adjusted value, and the wireless communication device dynamically adjusts the CWS based on whether the previous transmission is correctly received by a receiving node. In this way, the appropriate CWS value may be obtained based on a channel state and a network service load, and a compromise is obtained between reducing collision between transmitting nodes and improving a channel access efficiency. As illustrated in FIG. 3, a CWS corresponding to first physical downlink shared channel (PDSCH) transmission is 15. During first downlink transmission, a user fails to receive data on the PDSCH, and the base station adjusts the CWS value to CWS=31 based on an incorrect receiving state, and generates a random number N and performs channel listening using the adjusted CWS before second downlink shared channel transmission.

It needs to be noted that, the four channel detection categories are only exemplarily introduced. With evolution of communication technologies, the four channel detection mechanisms may vary or a new channel detection category may be generated, however, they are all applied to the technical solution described in the disclosure.

Second, in order to facilitate understanding of the embodiments of the disclosure, an application scene for wireless communication is explained.

Figure 4:
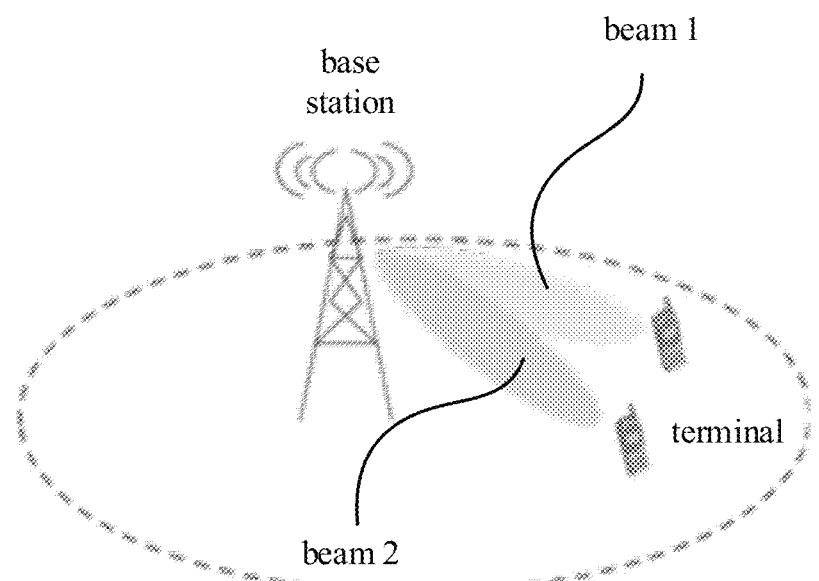
FIG. 4 is a diagram illustrating a wireless communication system according to an example embodiment.

As illustrated in FIG. 4, in a related wireless communication system, the wireless communication system includes a base station and a terminal. The base station may transmit control information or service information to a served terminal through an omnidirectional antenna. In some scenes, the base station further may transmit information to the terminal by means of beamforming. However, the service beam cannot be dynamically changed. In an NR system, data transmission based on a beam is introduced. The base station may transmit control information and data information to the served terminal on a certain beam.

When the transmitter supports transmission based on beams, and the transmitter has a plurality of antenna panels and can support simultaneous data transmission on a plurality of beams (for example, a beam 1 and a beam 2 in FIG. 4), channel detection mechanisms on different beams need to be clarified.

Figure 5:
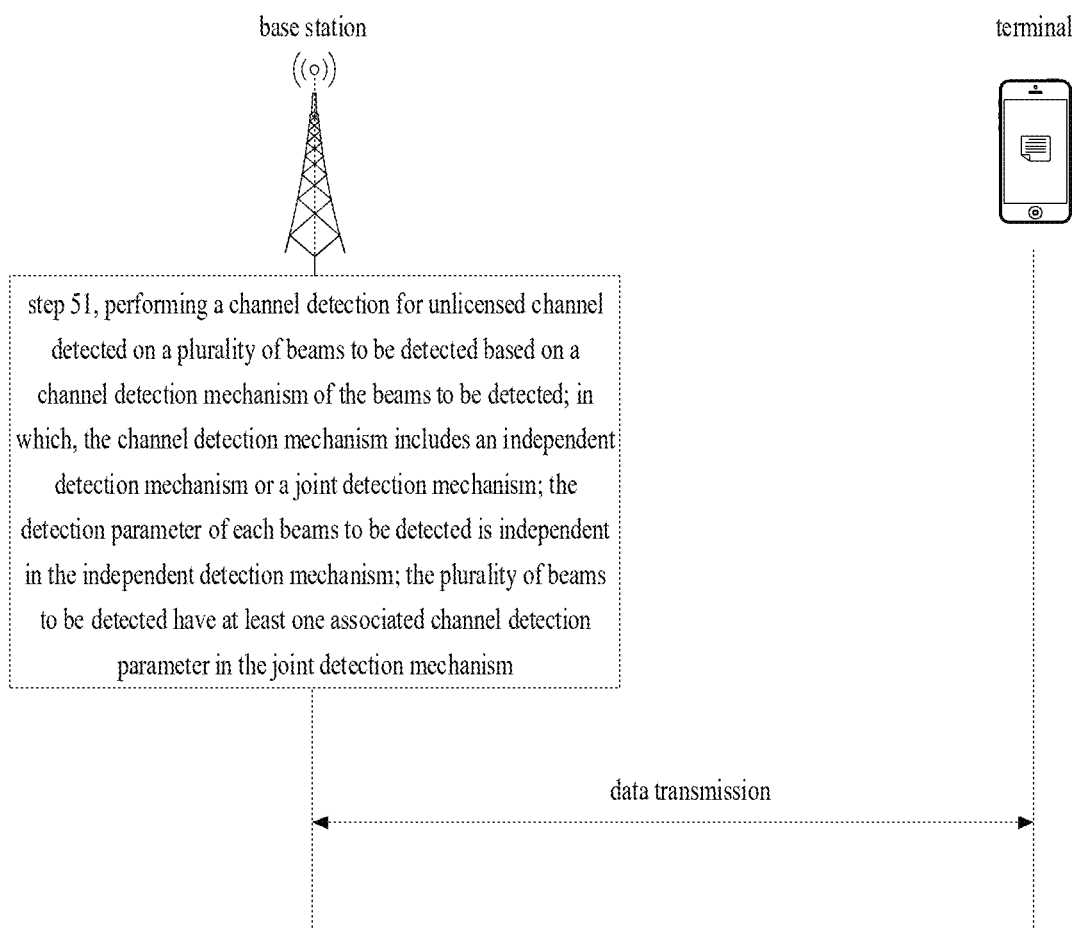
FIG. 5 is a flowchart illustrating a method for detecting an unlicensed channel according to an example embodiment.

As illustrated in FIG. 5, a method for detecting an unlicensed channel is provided in the embodiment. The method is applied to a transmitter. The method includes:

step 51, performing a channel detection for unlicensed channel on a plurality of beams to be detected based on channel detection mechanisms of beams to be detected.

The channel detection mechanisms include an independent detection mechanism or a joint detection mechanism. A detection parameter of each beams to be detected is independent in the independent detection mechanism. The plurality of beams to be detected have at least one associated channel detection parameter in the joint detection mechanism.

In various embodiments of the present disclosure, the beams to be detected may be determined by any one of the existing methods, which are not limited in embodiments of the present disclosure.

In one embodiment, the transmitter may be a terminal. The terminal may be but not limited to a mobile phone, a wearable device, a vehicle terminal, a road side unit (RSu), a smart home terminal, an industrial sensing device and/or a medical device.

In one embodiment, the transmitter may be a base station. The base station is an interface device a terminal accesses internet. The base station may be various types, for example, a 3G base station, a 4G base station, a 5G base station or other evolutionary base station.

In one embodiment, the transmitter is a base station, and the base station may include a plurality of antennas, the plurality of antennas may generate a plurality of beams in different transmission directions, and the plurality of beams in transmission directions jointly cover a cell served by the base station. The base station may directionally transmit information to the terminal in the cell through beam, or may directionally receive information transmitted by the terminal in the cell through beam. The beam configured to transmit information may be referred to as a transmitting beam, and the beam configured to receive information may be referred to as a receiving beam. Similarly, the transmitter may also be a terminal, and the terminal may also transmit information to a base station through beam in a similar manner, or receive information transmitted by a base station through beam.

In one embodiment, when the transmitter needs to perform beam-based information transmission on an unlicensed spectrum, it is necessary to detect whether the channel on the beam is idle, and the channel can be occupied to transit information only when the channel is idle.

In one embodiment, when the transmitter performing the channel detection for unlicensed channel using the transmitting beam, a signal strength of a signal from another device is monitored on the channel using the receiving beam corresponding to the transmitting beam.

In one embodiment, with respect to detecting whether the channel on the transmitting beam is idle, the unlicensed channel is detected using the receiving beam corresponding to the transmitting beam.

In one embodiment, when the transmitter detects that the signal strength on the receiving beam corresponding to the transmitting beam is less than a signal strength threshold, it is determined that the unlicensed channel is idle on the transmitting beam; and when the transmitter detects that the signal strength on the receiving beam corresponding to the transmitting beam is greater than the signal strength threshold, it is determined that the unlicensed channel is busy on the transmitting beam.

In one embodiment, when the transmitter is a base station, the base station may determine that the channel detection category on the transmitting beam is the second category (CAT2) in response to the information to be transmitted being a synchronization signal block (SSB) or a reference signal (RS).

In one embodiment, when the transmitter is a base station, the base station may determine that the channel detection category on the transmitting beam is the third category (CAT3) or the fourth category (CAT4) in response to the information to be transmitted including downlink control information (DCI) or downlink service data, that is, in response to being about to transmit information by occupying a DownlinkControl Channel (PDCCH) or a Physical Downlink Shared Channel (PDSCH).

In one embodiment, when the transmitter is a terminal, the terminal may determine that the channel detection category on the transmitting beam is the second category (CAT2) in response to the terminal transmitting a random access request to the base station, that is, needing to transmit information by occupying a Physical Random Access Channel (PRACH).

In one embodiment, when the transmitter is a terminal, the terminal may determine that the channel detection category on the transmitting beam is the third category (CAT3) or the fourth category (CAT4) in response to the information that needs to be transmitted including uplink control information (UCI) or uplink service data, that is, needing to transmit information by occupying a Physical Uplink Control Channel (PUCCH) or a Physical Uplink Shared Channel (PUSCH).

In one embodiment, the transmitter determines a corresponding channel detection category on the transmitting beam based on a preset rule, and detects whether the channel on the transmitting beam is idle. When the channel on the transmitting beam is detected idle, information can be transmitted through the channel on the transmitting beam.

In one embodiment, when the transmitter is a base station, the base station may transmit information such as SSB, RS, DCI or downlink service data to the terminal through the channel on the transmitting beam when detecting that the channel on the transmitting beam is idle.

In one embodiment, when the transmitter is a terminal, the terminal may transmit information such as a random access request, UCI or uplink service data to the base station through the channel on a target beam when detecting that the channel on the target beam is idle.

In one embodiment, when the channel detection for unlicensed channel is performed on a plurality of beams to be detected, the channel detection mechanism may be an independent channel detection mechanism. In the independent detection mechanism, the channel detection parameter of each beam to be detected is independent, and the channel detection for unlicensed channel may be performed on each beam to be detected using the channel detection parameter.

In one embodiment, the channel detection parameters being independent may refer to that, when detection is performed on respective beams to be detected using the channel detection parameters, whether channel detection is performed on respective beams to be detected are not associated, and/or the channel detection time of respective beams to be detected are not associated, and/or the channel detection orders of respective beams to be detected are not associated, and/or the channel detection results of respective beams to be detected are not associated.

In one embodiment, each beam to be detected is independently configured with channel detection parameters of the beam to be detected. Channel detection may be performed on each beam to be detected using the detection parameters corresponding to the beam to be detected. The detection parameters corresponding to respective beams to be detected may be the same, and also may be different.

In one embodiment, the channel detection parameters may include a detection time granularity, a channel detection time length, a contention window length and a state condition of triggering channel detection, etc.

In one embodiment, when performing the channel detection for unlicensed channel on a plurality of beams to be detected, the channel detection mechanism may be a joint channel detection mechanism. The plurality of beams to be detected have at least one associated channel detection parameter in the joint detection mechanism.

In one embodiment, in the joint detection mechanism, whether channel detection is performed on the plurality of beams to be detected is associated, and/or the channel detection time of respective beams to be detected are associated, and/or the channel detection orders of the plurality of beams to be detected are associated, and/or the channel detection results of the plurality of beams to be detected are associated. The correlation is represented in at least one associated channel detection parameter.

In one embodiment, the associated channel detection parameter may include a detection priority of each of the beams be detected. In the joint detection mechanism, the transmitter may determine based on the associated channel detection parameter, a detection sequence when the channel detection for unlicensed channel is performed on the plurality of beams to be detected.

In an embodiment of the present disclosure, in the unlicensed frequency band scene, two channel detection mechanisms of the independent detection mechanism and the joint detection mechanism are provided for performing channel detection for unlicensed channel on the plurality of beams to be detected. In the independent detection mechanism, the channel detection parameters of each beam to be detected are independent, and independent channel detection may be performed on each beam to be detected using the corresponding channel detection parameters.

In the joint detection mechanism, the plurality of beams to be detected have at least one associated channel detection parameter, and joint channel detection may be performed on each beam to be detected using the corresponding associated channel detection parameter.

The above two channel detection mechanisms may meet channel detection requirements in different scenes, and acquire an accurate channel detection result, which provides an accurate reference for channel occupation of the transmitter for data transmission on the plurality of beams to be detected, and reduces interferences to the channel when performing data transmission on the plurality of beams to be detected in the unlicensed scene.

Figure 6:
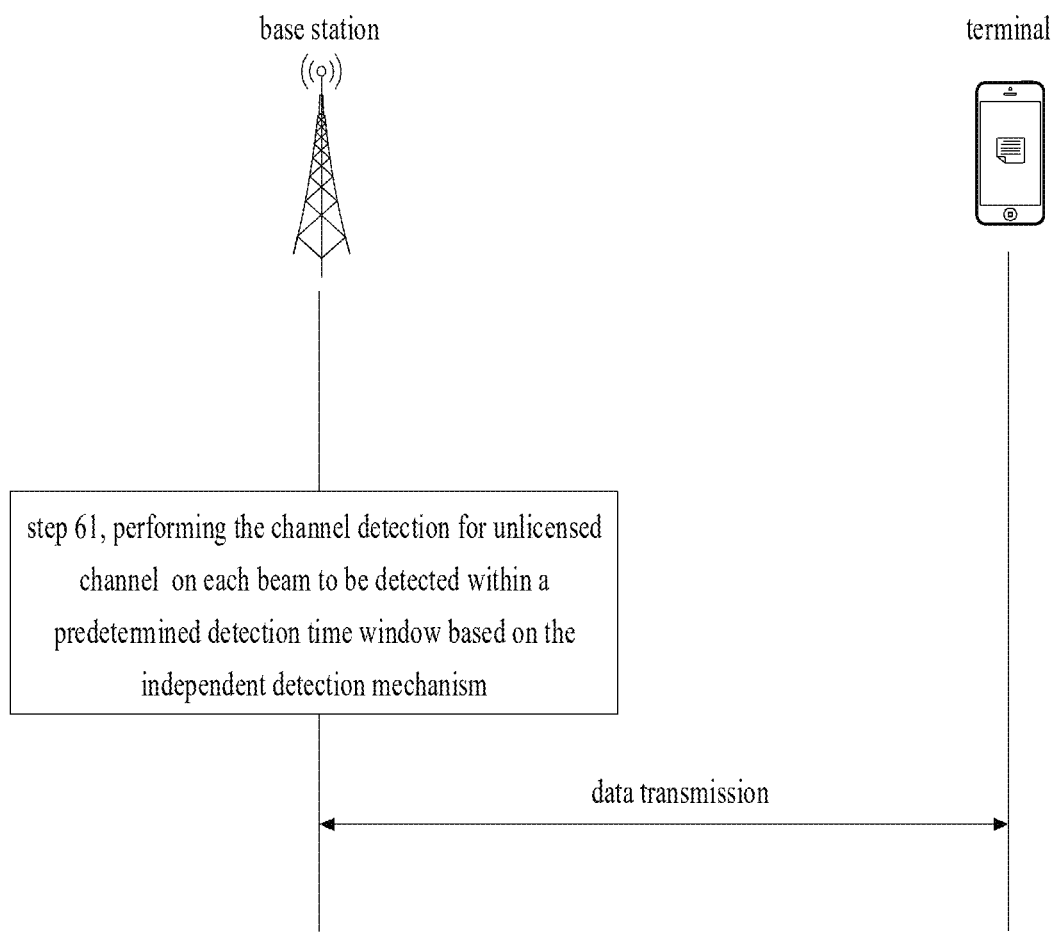
FIG. 6 is a flowchart illustrating a method for detecting an unlicensed channel according to an example embodiment.

As illustrated in FIG. 6, a method for detecting an unlicensed channel is provided in the embodiment. At step 51, performing the channel detection for unlicensed channel on a plurality of beams to be detected based on a channel detection mechanism of the beams to be detected, includes:

step 61, performing the channel detection for unlicensed channel on each beam to be detected within a predetermined detection time window based on the independent detection mechanism.

Figure 7:
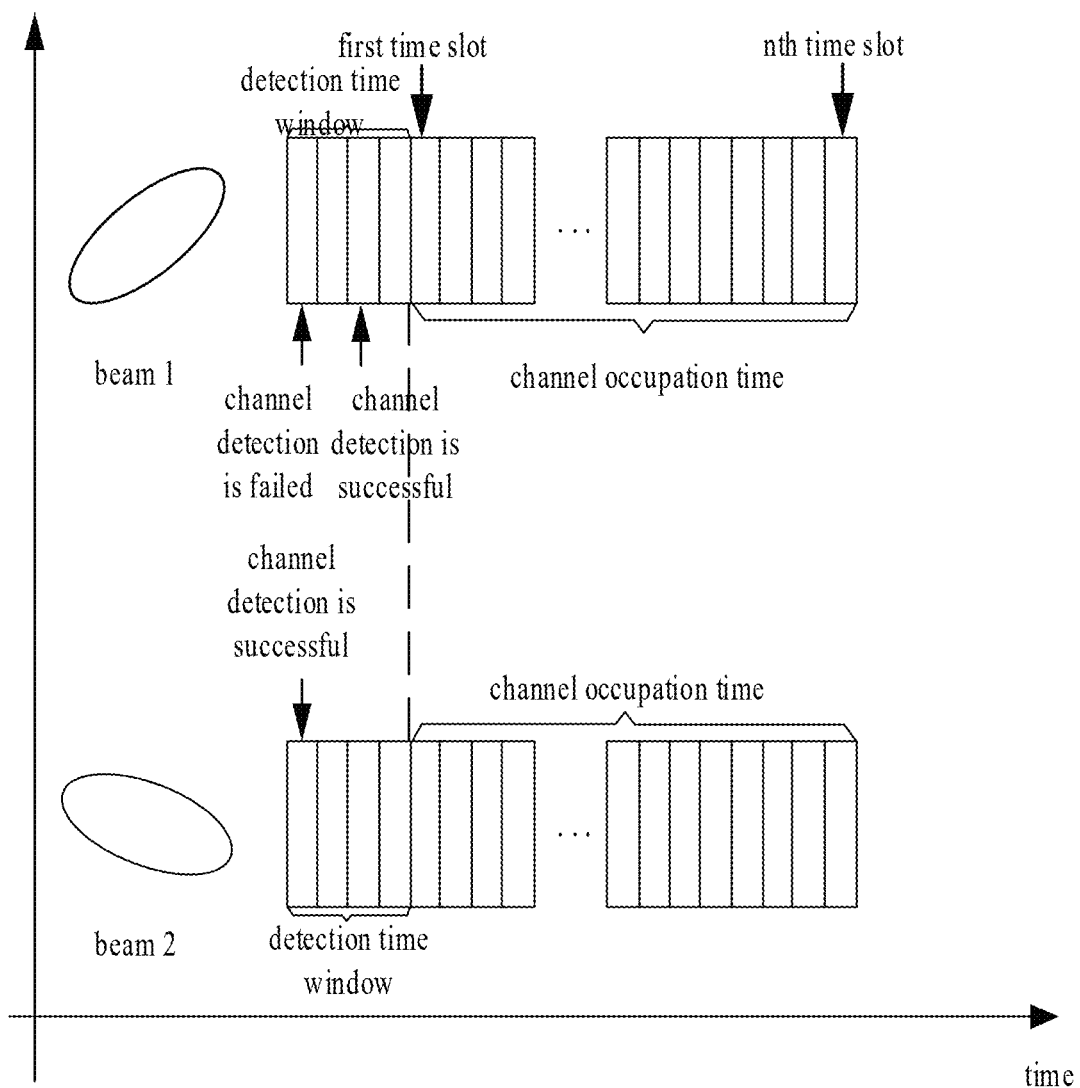
FIG. 7 is a flowchart illustrating a method for detecting an unlicensed channel according to an example embodiment.

In one embodiment, as illustrated in FIG. 7, for example, the transmitter supports simultaneous data transmission on two beams. It needs to be noted that, the embodiment of the disclosure may be applied to a case in which the transmitter supports simultaneous data transmission on more beams. The two beams here are a beam 1 and a beam 2. The predetermined detection time window may include four time units. Here, the time unit may be a time slot, a symbol, etc.

In one embodiment, the channel detection for unlicensed channel is performed on the beam 1 and the beam 2 within the same detection time window based on the channel detection parameters. Or, the channel detection for unlicensed channel is performed on the beam 1 and the beam 2 within different detection time windows based on the channel detection parameters. For example, the unlicensed channel is detected idle on the beam 2 in a first time unit of the detection time window, and the unlicensed channel is detected idle on the beam 1 in a third time unit of the detection time window.

In one embodiment, when the unlicensed channel is detected idle on the beam 2, data may not be transmitted immediately using the beam 2, but data may be transmitted using the beam 1 and the beam 2 after waiting until the unlicensed channel is detected idle on the beam 1.

In one embodiment, data may be transmitted using the beam 1 and the beam 2 starting from an end position of a detection time window.

Figure 8:
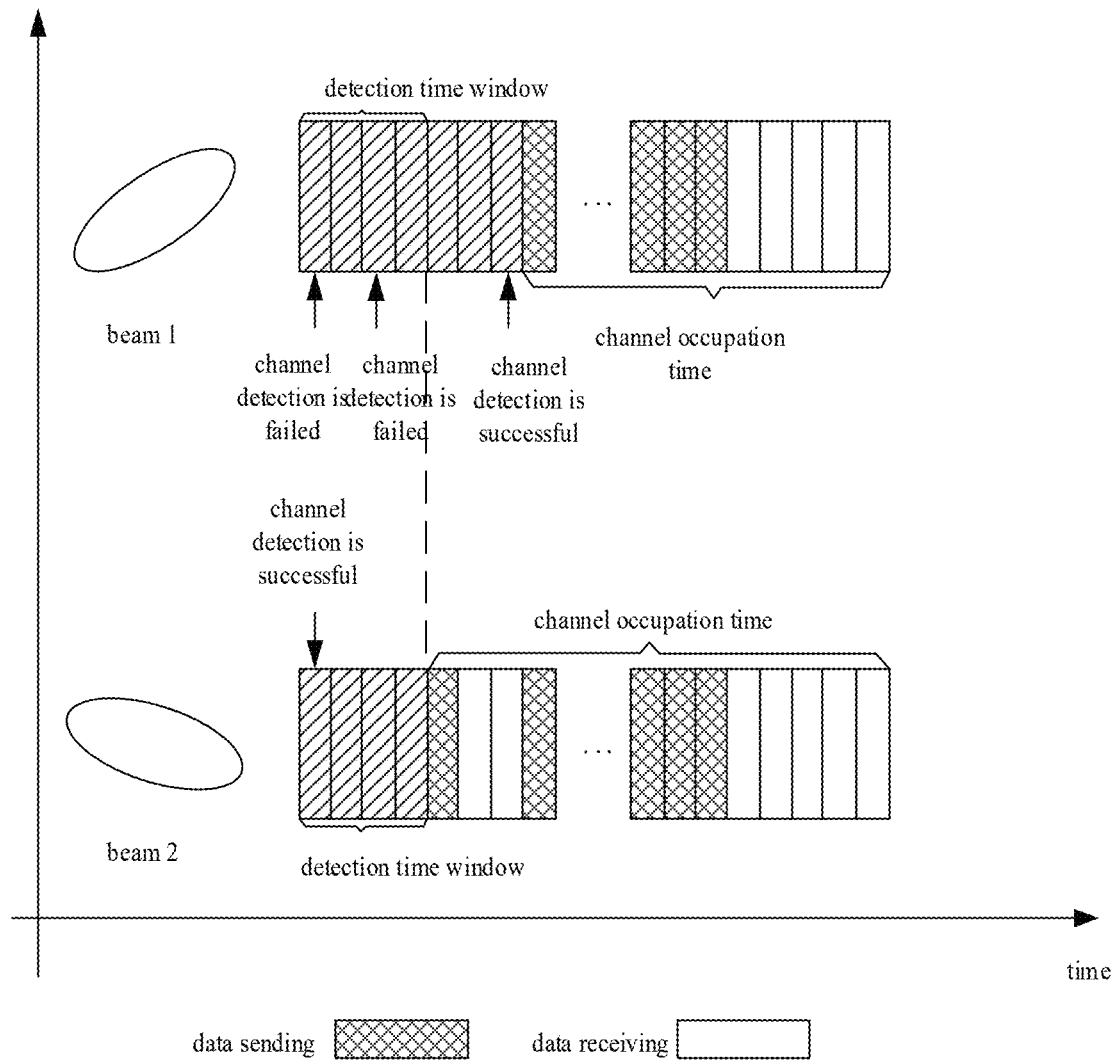
FIG. 8 is a flowchart illustrating a method for detecting an unlicensed channel according to an example embodiment.

In one embodiment, as illustrated in FIG. 8, the channel detection for unlicensed channel is performed simultaneously on the beam 1 and the beam 2 based on the channel detection parameters. The unlicensed channel is detected idle on the beam 2 in the first time unit of the detection time window. The unlicensed channel is not detected idle on the beam 1 within the detection time window. The transmitter may perform data transmission on the beam 2 at the end position of the detection time window.

In one embodiment, after the detection time window ends, the transmitter may continently perform the channel detection on the beam 1, and perform the channel detection on the beam 2 in a time unit for receiving data, until detecting that the unlicensed channel is idle.

In one embodiment, when the beam 1 and the beam 2 occupy the channel, the channel occupancy time of the beam 1 and the beam 2 may be the same or different.

In the embodiment, the channel detection for unlicensed channel is performed on each beam to be detected within the predetermined detection time window based on the independent detection mechanism, and the channel detection for unlicensed channel may be performed on each beam simultaneously within the predetermined detection time, and data transmission may be performed on corresponding beams, which ensures fair occupation for the unlicensed channel by the beams.

Figure 9:
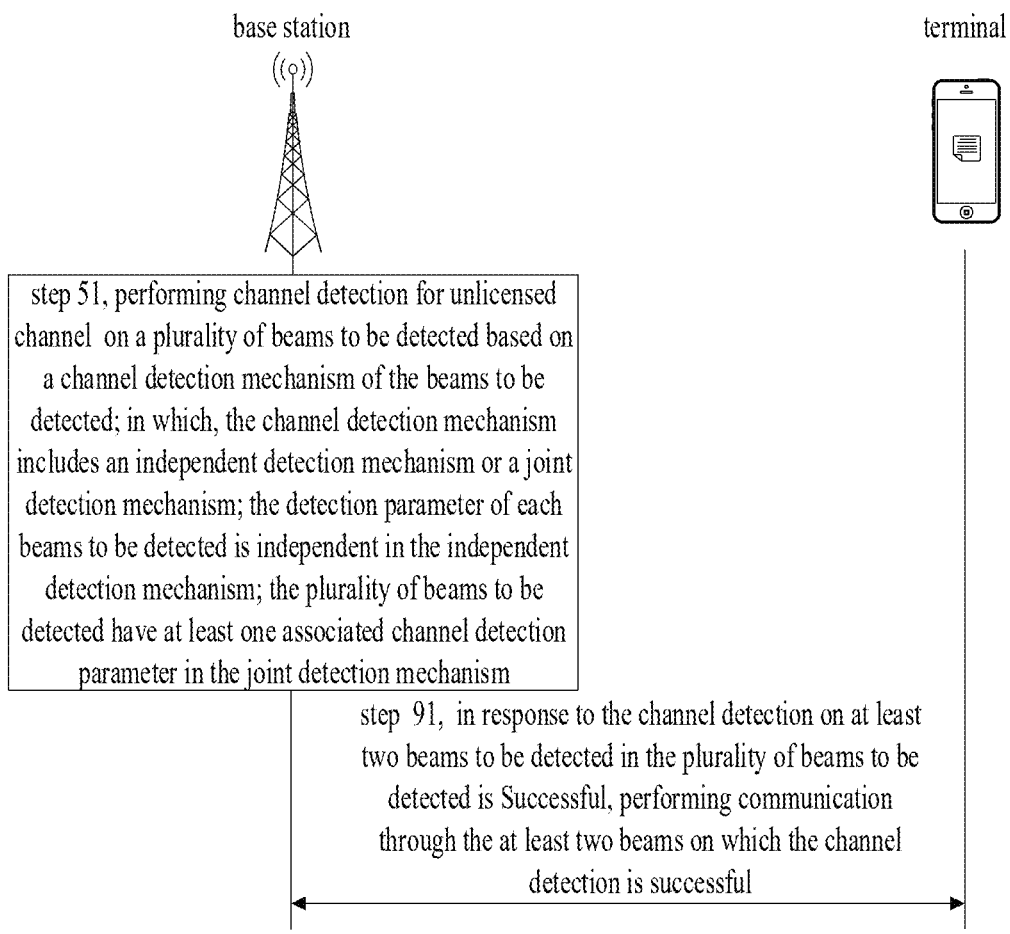
FIG. 9 is a flowchart illustrating a method for detecting an unlicensed channel according to an example embodiment.

As illustrated in FIG. 9, a method for detecting an unlicensed channel is provided in the embodiment. The method further includes:

step 91, in response to the channel detection on at least two beams to be detected in the plurality of beams to be detected is successful, performing communication through the at least two beams on which the channel detection is successful.

In one embodiment, communication may be performed using the beam on which the channel detection is successful in response to successful channel detection on the beam to be detected.

In one embodiment, performing the communication using the beam on which the channel detection is successful may be performing data transmission using the beam on which the channel detection is successful.

Figure 10:
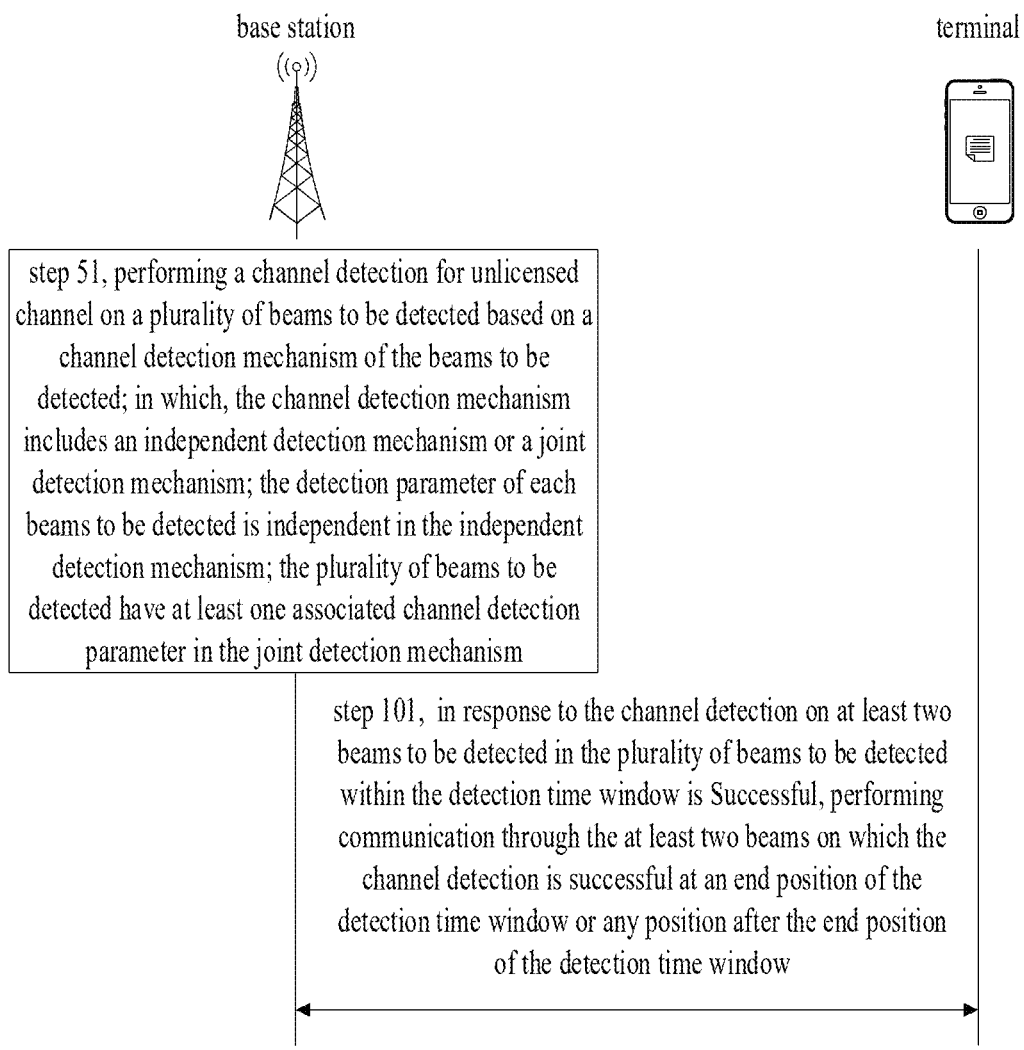
FIG. 10 is a flowchart illustrating a method for detecting an unlicensed channel according to an example embodiment.

As illustrated in FIG. 10, a method for detecting an unlicensed channel is provided in the embodiment. At step 91, in response to the channel detection on at least two beams to be detected in the plurality of beams to be detected is successful, performing the communication through the at least two beams on which the channel detection is successful, includes:

step 101, in response to the channel detection on the at least two beams to be detected in the plurality of beams to be detected within the detection time window is successful, performing the communication through the at least two beams on which the channel detection is successful at an end position of the detection time window or any position after the end position of the detection time window.

In one embodiment, as illustrated in FIG. 7, the detection time window includes four time slots, and the end position of the time window may be an end position of a fourth time slot. The any position after the end position of the detection time window may be a first time slot, a second time slot, and a third time slot after the end position.

In one embodiment, for different beams on which the channel detection is successful, the positions where communication is performed may be different. For example, there are two beams on which the channel detection is successful, that is, the beam 1 and the beam 2, the beam 1 may transmit data on the first time slot after the end position of the detection time window, and the beam 2 may transmit data on the second time slot after the end position of the detection time window.

In one embodiment, performing the communication through the at least two beams on which the channel detection is successful may be transmitting data through the at least two beams on which the channel detection is successful. The data transmitted by the beams on which detection is successful may be the same or may be different. When the beams on which detection is successful transmit different data, it has a higher data transmission rate; when the beams on which detection is successful transmit the same data, data transmission may be more reliable.

In one embodiment, the start positions and/or the end positions of the channel occupation time for the communication through the at least two beams on which the channel detection is successful are the same;
or,
the start positions and/or the end positions of the channel occupation time for the communication through the at least two beams on which the channel detection is successful are different.

In one embodiment, as illustrated in FIG. 7 again, the start positions and the end positions of the channel occupation time for communication of the beam 1 and the beam 2 on which the channel detection is successful are the same. Both the start positions of the beam 1 and the beam 2 are the first time slot after the end position of the detection time window, and the end positions of the beam 1 and the beam 2 are both an nth time slot after an end position of the detection time window. n is a positive integer.

In one embodiment, the start positions and the end positions of channel occupation for the communication through the beam 1 and the beam 2 on which the channel detection is successful are not the same. The start position of the beam 1 is the first time slot after the end position of the detection time window, the start position of the beam 2 is the second time slot after the end position of the detection time window, the end position of the beam 1 is the tenth time slot after the end position of the detection time window, and the end position of the beam 2 is the fifteenth time slot after the end position of the detection time window.

In one embodiment, the start positions of channel occupation for the communication through the beam 1 and the beam 2 on which the channel detection is successful are the same but the end positions are different. The start positions of the beam 1 and the beam 2 are both the second time slot after the end position of a detection time window, the end position of the beam 1 is the tenth time slot after the end position of the detection time window, and the end position of the beam 2 is the fifteenth time slot after the end position of the detection time window.

Figure 11:
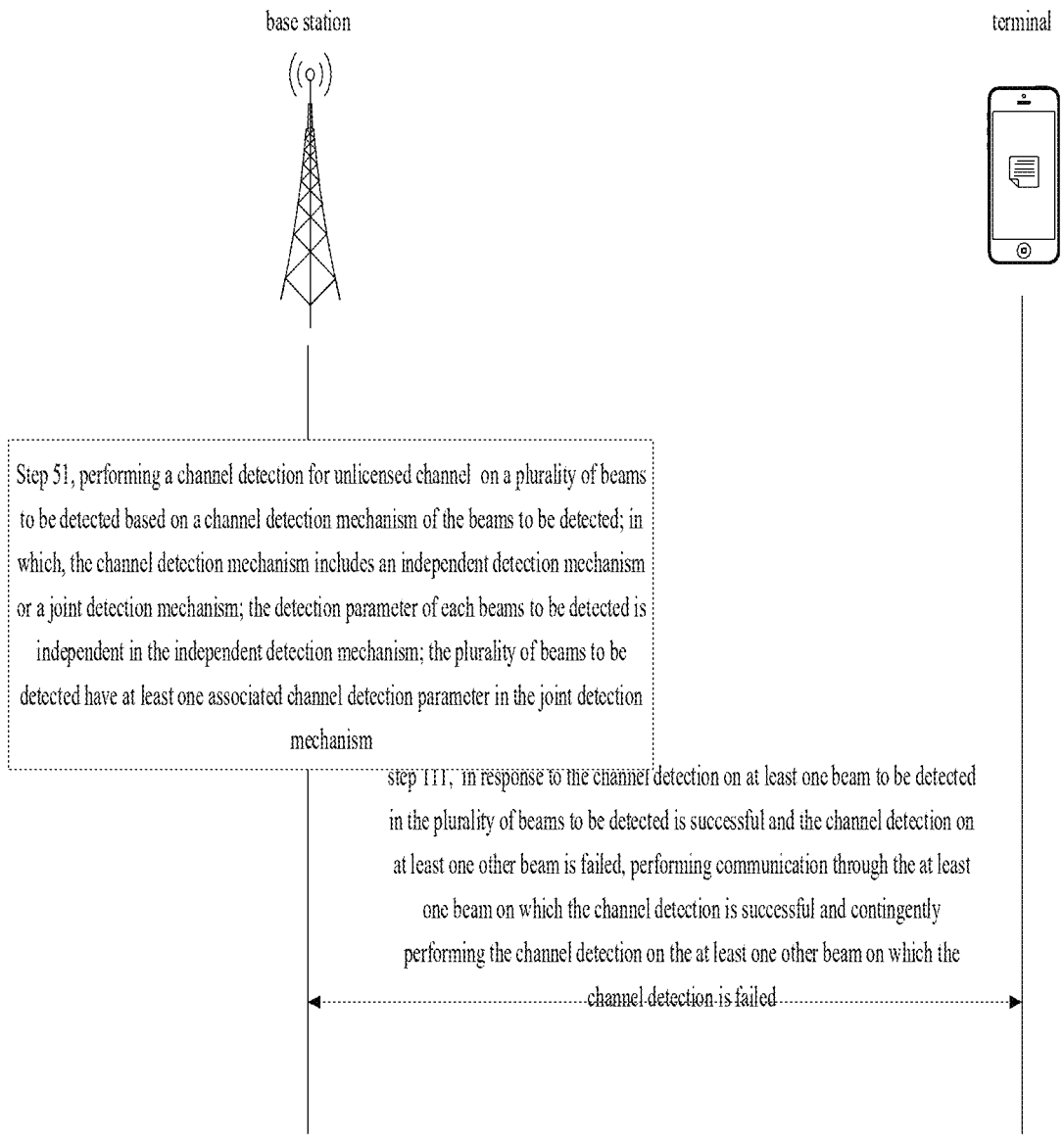
FIG. 11 is a flowchart illustrating a method for detecting an unlicensed channel according to an example embodiment.

As illustrated in FIG. 11, a method for detecting an unlicensed channel is provided in the embodiment. The method further includes:
step 111, in response to the channel detection on at least one beam to be detected in the plurality of beams to be detected is successful and the channel detection on at least one other beam is failed, performing communication through the at least one beam on which the channel detection is successful and contingently performing the channel detection on the at least one other beam on which the channel detection is failed.

In one embodiment, as illustrated in FIG. 8 again, channel detection is failed on the beam 1 within the detection time window, and channel detection is successful on the beam 2 within the detection time window. That is, communication may be performed on the first time slot after the end position of a detection time window using the beam 2.

In one embodiment, channel detection may be contingently performed on the beam 1 on any time slot after the end position of a detection time window until channel detection on the beam 1 is successful.

In one embodiment, the method further includes:
in response to the channel detection on at least one beam to be detected in the plurality of beams to be detected is successful and the channel detection on at least one other beam is failed, contingently performing the channel detection on the at least one other beam on which the channel detection is failed.

In one embodiment, as illustrated in FIG. 8 again, when the channel detection is failed on the beam 1 within the detection time window, and the channel detection is successful on the beam 2 within the detection time window, communication may not be performed on the first time slot after the end position of the detection time window using the beam 1, rather, communication may be performed using the beam 1 and the beam 2 after the channel is detected idle on the beam 1. For example, when the channel is detected idle on the beam 1 on the third time slot after the end position of the detection time window, communication may be performed on the fourth time slot after the end position of the detection time window using the beam 1 and the beam 2. Communication also may be performed first on the first time slot after the end position of the detection time window using the beam 2, and then communication may be performed using the beam 1 when the channel is detected idle on the beam 1.

In one embodiment, the channel detection may be contingently performed on the beam 1 on any time slot after the end position of the detection time window until channel detection on the beam 1 is successful.

In one embodiment, the method further includes:
in response to the channel detection on at least one beam to be detected in the plurality of beams to be detected is successful and the channel detection on at least one other beam is failed, contingently performing the channel detection on the at least one other beam on which the channel detection is failed; and performing communication on the at least two beams to be detected until the channel detection is successful on the at least two beams to be detected.

In one embodiment, as illustrated in FIG. 8 again, when the channel detection is failed on the beam 1 within the detection time window, and the channel detection is successful on the beam 2 within the detection time window, communication may not be performed on the first time slot after the end position of the detection time window using the beam 1, rather, communication is performed using the beam 1 and the beam 2 after the channel is detected idle on the beam 1. For example, when the channel is detected idle on the beam 1 on the third time slot after the end position of the detection time window, communication may be performed on the fourth time slot after the end position of a detection time window using the beam 1 and the beam 2.

Figure 12:
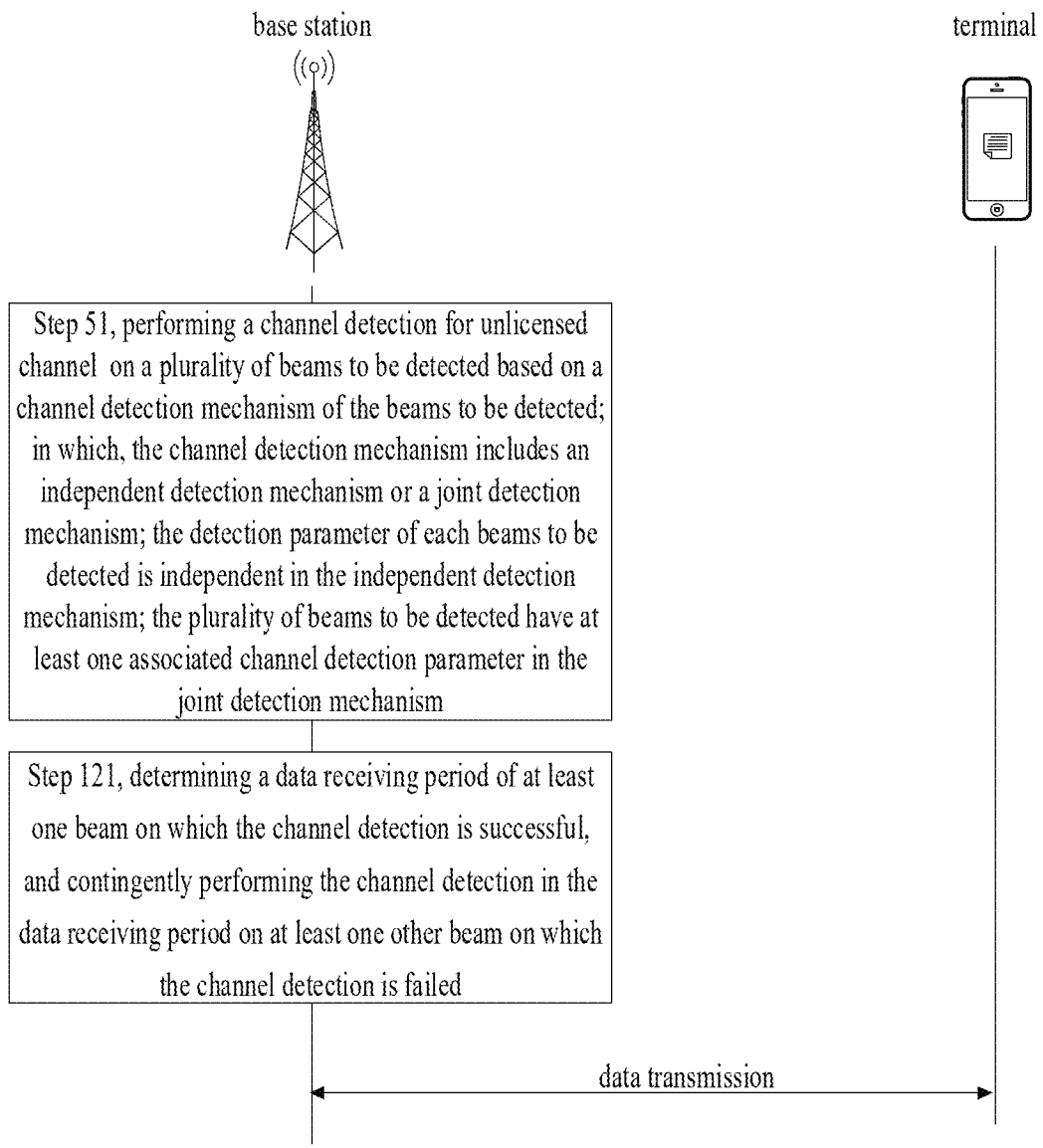
FIG. 12 is a flowchart illustrating a method for detecting an unlicensed channel according to an example embodiment.

As illustrated in FIG. 12, a method for detecting an unlicensed channel is provided in the embodiment. At step 111, contingently performing the channel detection on the at least one other beam on which the channel detection is failed, includes:

step 121, determining a data receiving period of the at least one beam on which the channel detection is successful, and contingently performing the channel detection in the data receiving period on the at least one other beam on which the channel detection is failed.

In one embodiment, as illustrated in FIG. 8 again, the channel detection is failed on the beam 1 within the detection time window, and the channel detection is successful on the beam 2 within the detection time window. The data receiving period may be the second time slot and the third time slot after the end position of the detection time window. In FIG. 8, channel detection is successful on the beam 1 on the third time slot after the end position of the detection time window.

Figure 13:
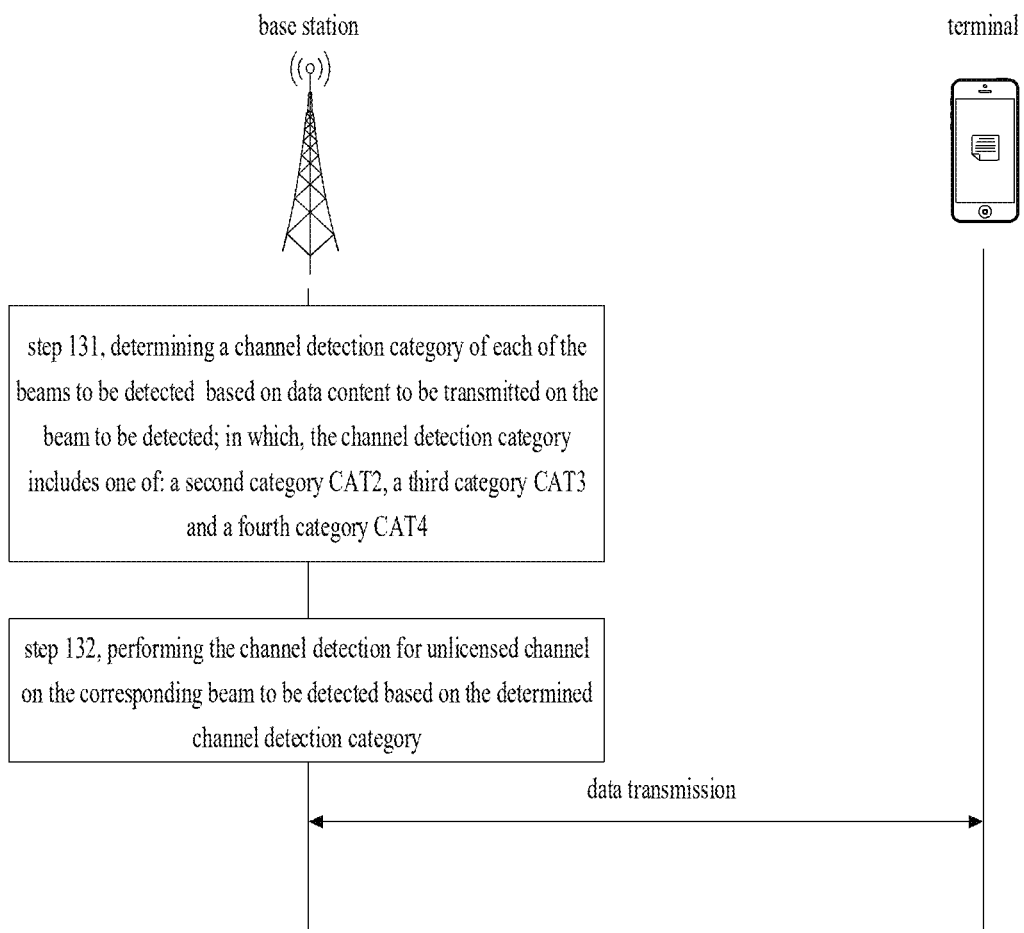
FIG. 13 is a flowchart illustrating a method for detecting an unlicensed channel according to an example embodiment.

As illustrated in FIG. 13, a method for detecting an unlicensed channel is provided in the embodiment. The method further includes:

step 131, determining a channel detection category of each of the beams to be detected based on data content to be transmitted on the beam to be detected. The channel detection category includes one of a second category CAT2, a third category CAT3 and a fourth category CAT4.

performing the channel detection for unlicensed channel on the plurality of beams to be detected, includes:

step 132, performing the channel detection for unlicensed channel on the corresponding beam to be detected based on the determined channel detection category.

In one embodiment, the data to be transmitted on the beam to be detected may be a control signaling or service data.

In one embodiment, when the transmitter is a base station, the control signaling may include DCI; service data may be data transmitted on a PDSCH, for example, multimedia data transmitted on the PDSCH.

In one embodiment, when the transmitter is a terminal, the control signaling may include UCI; service data may be data transmitted on a PUSCH, for example, multimedia data transmitted on the PUSCH.

Here, the channel detection category of each of the beams to be detected is determined based on the data content to be transmitted on the beam to be detected. The channel detection category of each beam to be detected may be determined based on characteristics of the data to be transmitted on the beam to be detected. The channel for transmitting control plane data may be detected using a channel detection mechanism that can access the channel quickly. For example, the channel for transmitting the control signaling may be detected using the CAT2. The channel for transmitting user plane data may be detected using a channel detection mechanism that can access the channel slowly. For example, the channel for transmitting service data is detected using the CAT4.

In one embodiment, the beam 1 needs to transmit the control signaling or service data, and the beam 2 needs to transmit some certain signals, for example, a demodulation reference signal (DRS). Then, the CAT4 of channel detection may be performed on the beam 1, and the CAT2 of channel detection may be performed on the beam 2.

Figure 14:
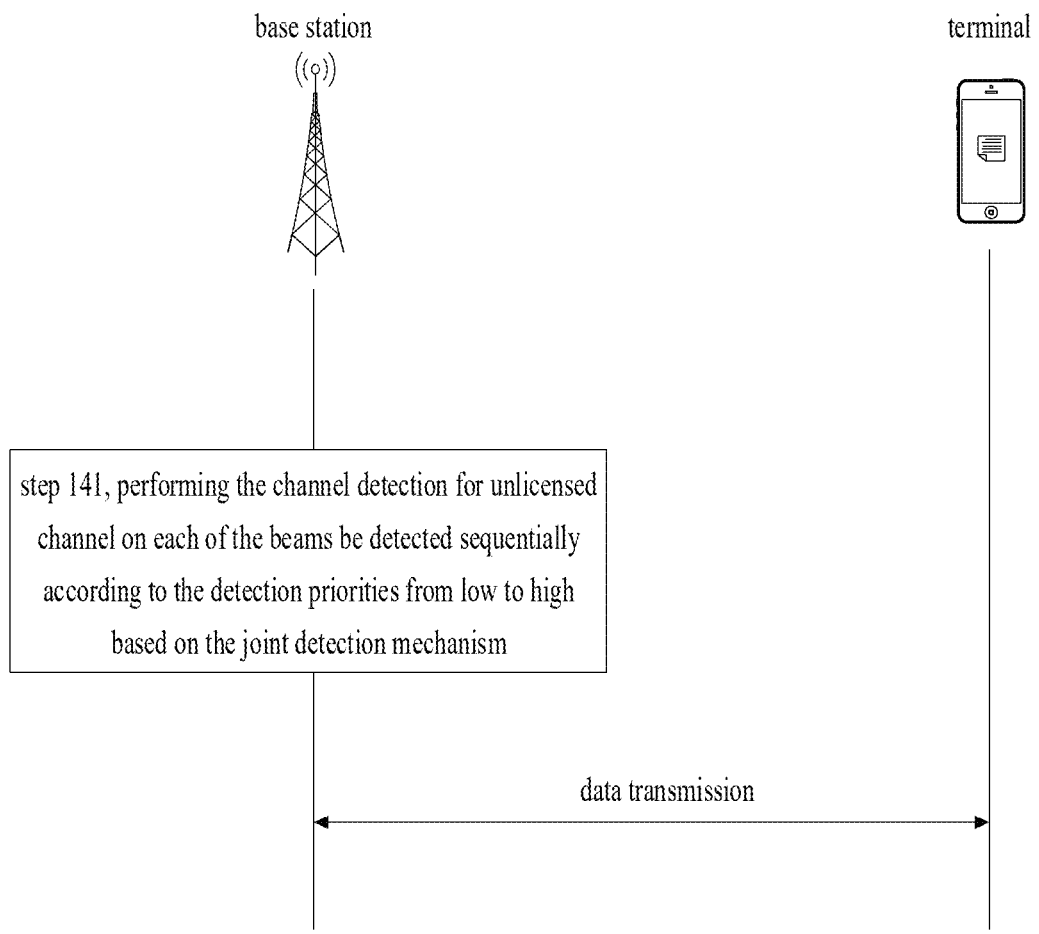
FIG. 14 is a flowchart illustrating a method for detecting an unlicensed channel according to an example embodiment.

As illustrated in FIG. 14, a method for detecting an unlicensed channel is provided in the embodiment. The associated channel detection parameter includes a detection priority of each beam to be detected;

at step 51, performing the channel detection for unlicensed channel on the plurality of beams to be detected based on the channel detection mechanism of the beams to be detected, includes:

step 141, performing the channel detection for unlicensed channel on each of the beams be detected sequentially according to the detection priorities from low to high based on the joint detection mechanism.

In one embodiment, the detection priority of the beam to be detected may be a priority of performing channel access on the beam to be detected.

In one embodiment, the priority of performing channel access on the beam to be detected is related to the detection category corresponding to the beam to be detected. For example, the detection categories of the beam 1, the beam 2 and the beam 3 are the CAT2, the CAT3 and the CAT4 sequentially, the priorities of performing channel access from high to low are correspondingly the beam 1, the beam 2 and the beam 3.

In one embodiment, the detection priority of the beam may be determined based on the time of channel access on the beam to be detected. For example, the CAT2 is adopted on the beam 1, the CAT3 is adopted on the beam 2, and the CAT4 is adopted on the beam 3. The time of channel access on the beams using the CAT1, CAT2, CAT3 and CAT4 are correspondingly, T1, T2, T3, T4, in which, T1<T2<T3<T4. It may be determined that the detection priorities of beams from high to low are correspondingly the beam 1, the beam 2 and the beam 3.

Figure 15:
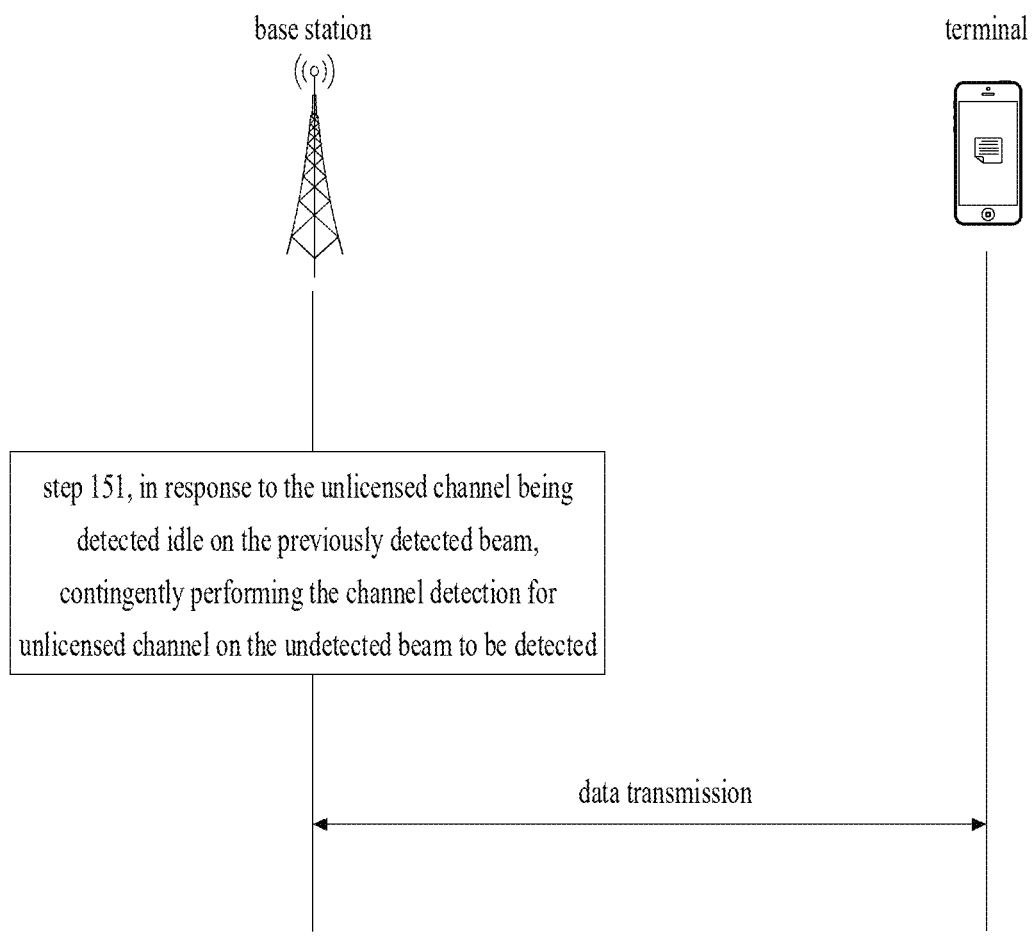
FIG. 15 is a flowchart illustrating a method for detecting an unlicensed channel according to an example embodiment.

As illustrated in FIG. 15, a method for detecting an unlicensed channel is provided in the embodiment. At step 101, performing the channel detection for unlicensed channel on each beam to be detected sequentially, includes:

step 151, in response to the unlicensed channel being detected idle on the previously detected beam, contingently performing the channel detection for unlicensed channel on the undetected beam to be detected.

In one embodiment, as illustrated in FIG. 11, detection is performed on the beam 1 using the CAT4. Detection is performed on the beam 2 using the CAT2. The priority of performing the channel access on the beam 1 is lower than the priority of performing the channel access on the beam 2. The transmitter may contingently perform the channel detection for unlicensed channel on the beam 2 on the second time unit only when detecting the idle unlicensed channel on the first time unit.

Figure 16:
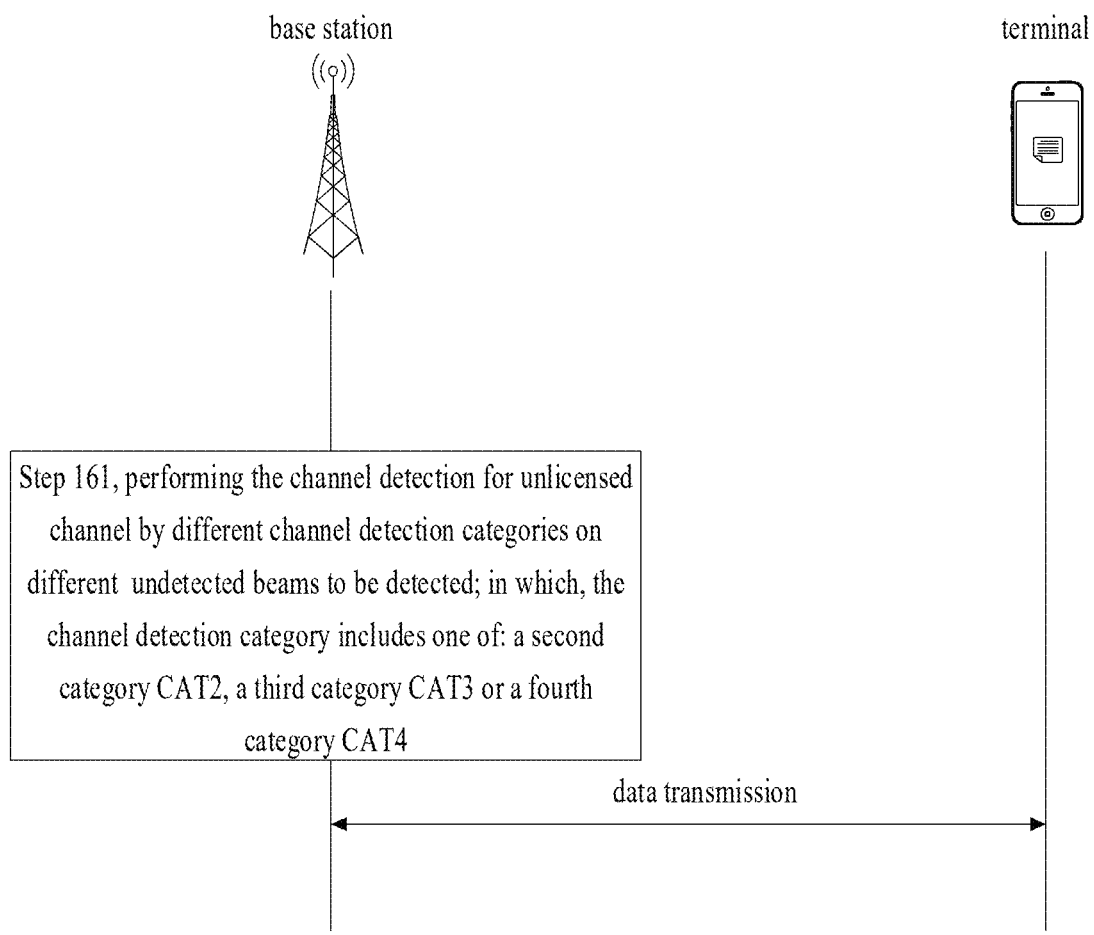
FIG. 16 is a flowchart illustrating a method for detecting an unlicensed channel according to an example embodiment.

As illustrated in FIG. 16, a method for detecting an unlicensed channel is provided in the embodiment. At step 111, performing the channel detection for unlicensed channel on the undetected beam to be detected, includes:

step 161, performing the channel detection for unlicensed channel by different channel detection categories on different undetected beams be detected; in which the channel detection category includes one of: the second category CAT2, the third category CAT3 or the fourth category CAT4.

In one embodiment, the different undetected beams to be detected are the beam 1 and the beam 2. The beam 1 needs to transmit the control data or service data, and the beam 2 needs to transmit some certain signals, for example, the demodulation reference signal (DRS). Then, the CAT4 of channel detection may be performed on the beam 1, and the CAT2 of channel detection may be performed on the beam 2.

In one embodiment, the associated channel detection parameter includes a detection time of each beam to be detected; performing the channel detection for unlicensed channel on the plurality of beams to be detected based on the channel detection mechanism of the beams to be detected, includes:

performing the channel detection for unlicensed channel on each of the beams to be detected based on the detection time of each beam to be detected according to the joint detection mechanism.

Figure 17:
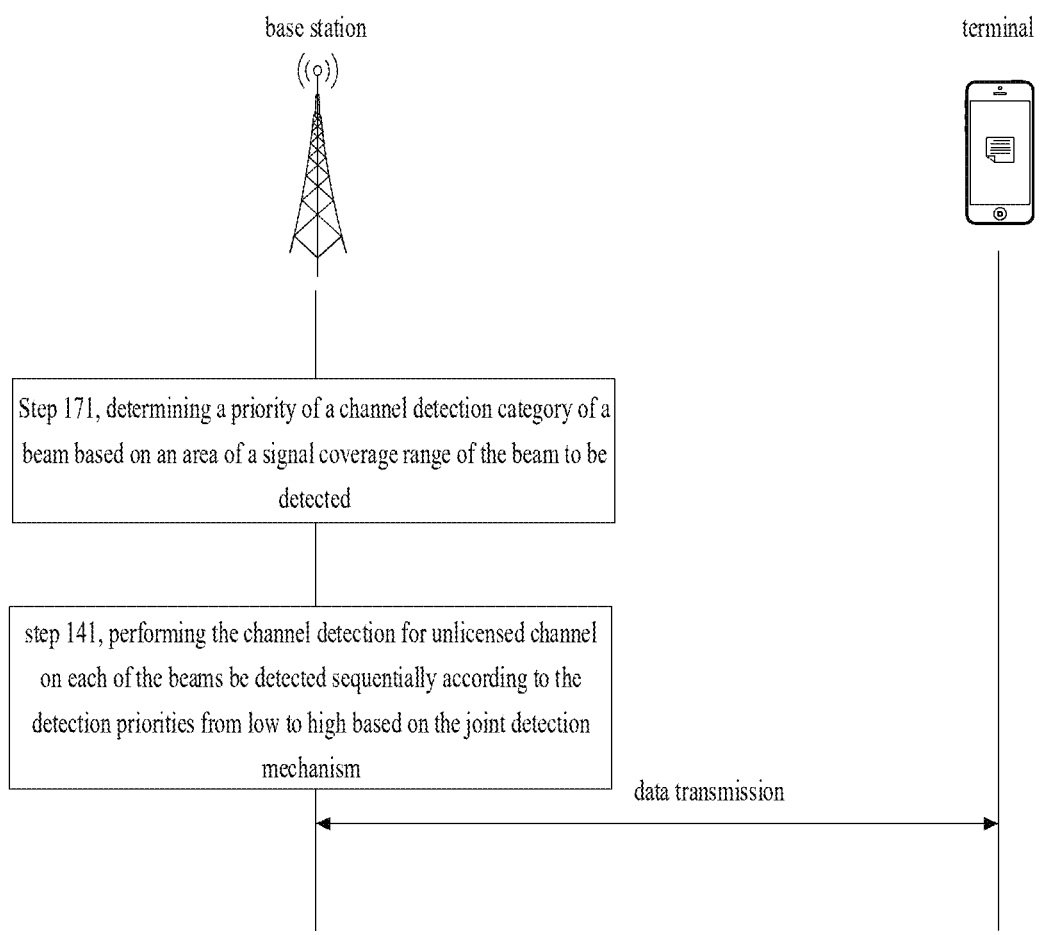
FIG. 17 is a flowchart illustrating a method for detecting an unlicensed channel according to an example embodiment.

As illustrated in FIG. 17, a method for detecting an unlicensed channel is provided in the embodiment. The method further includes:

step 171, determining a priority of the channel detection category of the beam based on an area of a signal coverage range of the beam to be detected.

In one embodiment, priorities of channel detection categories of beams to be detected are set from high to low based on the areas of signal coverage ranges of the beams to be detected from small to large.

In one embodiment, the area of the coverage range of the beam 1 is relatively larger than the area of the coverage range of the beam 2, then the transmitter may perform the channel detection category with a lower priority, for example, the CAT4 of channel detection, on the beam 1, and perform the channel detection category with a higher priority, for example, a CAT2 of channel detection, on the beam 2 when channel detection on the beam 1 is successful, and start data interaction on the beam 1 and the beam 2 when the channel detection is successful.

The channel detection category with the lower priority is performed on the beam with a relatively large area of coverage range, and the channel detection category with the higher priority is performed on the beam with a relatively small area of coverage range, so that the channel may be quickly accessed on the beam with the relatively small area of coverage range, which ensures fairness of transmitting data using different beams.

Figure 18:
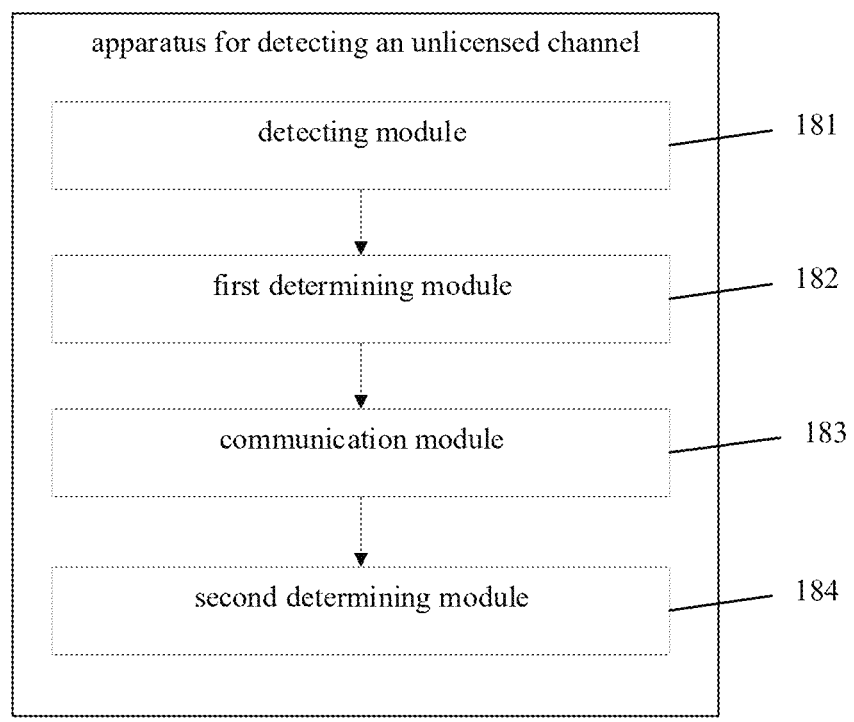
FIG. 18 is a block diagram illustrating an apparatus for detecting an unlicensed channel according to an example embodiment.

As illustrated in FIG. 18, an apparatus for detecting an unlicensed channel is provided in the embodiment of the disclosure. The apparatus is applied to a transmitter. The apparatus includes a detecting module 181.

The detecting module 181 is configured to: perform a channel detection for unlicensed channel on a plurality of beams to be detected based on a channel detection mechanism of the beams to be detected.

The channel detection mechanism includes an independent detection mechanism or a joint detection mechanism; the detection parameter of each beams to be detected is independent in the independent detection mechanism; the plurality of beams to be detected have at least one associated channel detection parameter in the joint detection mechanism.

In one embodiment, the detecting module 181 is further configured to: perform the channel detection for unlicensed channel on each beam to be detected within a predetermined detection time window based on the independent detection mechanism.

In one embodiment, the apparatus further includes a first determining module 182.

The first determining module 182 is configured to: determine a channel detection category of each beams to be detected based on data content to be transmitted on the beam to be detected; in which, the channel detection category includes at least one of: a second category CAT2, a third category CAT 2 or a fourth category 4.

The detecting module 181 is further configured to: perform the channel detection for unlicensed channel on the corresponding beam to be detected based on the determined channel detection category.

In one embodiment, the apparatus further includes a communication module 183.

The communication module 183 is configured to:

in response to the channel detection on at least two beams to be detected in the plurality of beams to be detected is successful, perform communication through the at least two beams on which the channel detection is successful.

In one embodiment, the communication module 183 is further configured to:

in response to the channel detection on at least two beams to be detected in the plurality of beams to be detected within the detection time window is successful, perform communication through the at least two beams on which the channel detection is successful at an end position of the detection time window or any position after the end position of the detection time window.

In one embodiment, the communication module 183 is further configured such that: start positions and/or end positions of a channel occupation time for the communication through the at least two beams on which the channel detection is successful are the same;

or, the start positions and/or the end positions of the channel occupation time for the communication through the at least two beams on which the channel detection is successful are different.

In one embodiment, the detecting module 181 is further configured to:

in response to the channel detection on at least one beam to be detected in the plurality of beams to be detected is successful and the channel detection on at least one other beam is failed, perform communication through the at least one beam on which the channel detection is successful and contingently performing the channel detection on the at least one other beam on which the channel detection is failed.

In one embodiment, the communication module 183 is further configured to:

in response to the channel detection on at least one beam to be detected in the plurality of beams to be detected is successful and the channel detection on at least one other beam is failed, contingently perform the channel detection on the at least one other beam on which the channel detection is failed.

In one embodiment, the communication module 183 is further configured to:

in response to the channel detection on at least one beam to be detected in the plurality of beams to be detected is successful and the channel detection on at least one other beam is failed, contingently perform the channel detection on the at least one other beam on which the channel detection is failed; and perform communication on the at least two beams to be detected until the channel detection is successful on the at least two beams to be detected.

In one embodiment, the communication module 181 is further configured to:

determine a data receiving period of the at least one beam on which the channel detection is successful, and contingently perform the channel detection in the data receiving period on the at least one other beam on which the channel detection is failed.

In one embodiment, the associated channel detection parameter includes a detection priority of each of the beams be detected.

The detecting module 181 is further configured to: perform the channel detection for unlicensed channel on each of the beams be detected sequentially according to the detection priorities from low to high based on the joint detection mechanism.

In one embodiment, the detecting module 181 is further configured to: in response to the unlicensed channel being detected idle on the previously detected beam, contingently perform the channel detection for unlicensed channel on the undetected beam to be detected.

In one embodiment, the detecting module 181 is further configured to: perform the channel detection for unlicensed channel by different channel detection categories on different undetected beams to be detected; in which the channel detection category includes one of: a second category CAT2, a third category CAT3 or a fourth category CAT4.

In one embodiment, the apparatus further includes a second determining module 144. The second determining module 144 is configured to: determine a priority of a channel detection category of a beam based on an area of a signal coverage range of the beam to be detected.

With regard to the apparatus in the above embodiments, the specific way in which each module performs the operation has been described in detail in the embodiments of the method and will not be elaborated here.

A communication device is provided in an embodiment of the disclosure, and includes:
 a processor;
 a memory configured to store instructions executable by the processor;
 wherein, the processor is configured to: implement the method as described in any above embodiment when running the executable instructions.

The processor may include various types of storage mediums. The storage medium is a non-transitory computer storage medium, and may continue memorizing information stored thereon when the communication device is powered off.

The processor may be connected to the memory via a bus, and may be configured to read an executable program stored on the memory.

A computer storage medium stored with computer executable instructions is provided in an embodiments of the present disclosure. The executable program implements the method as described in any above embodiment when executed by a processor.

With regard to the apparatus in the above embodiments, the specific way in which each module performs the operation has been described in detail in the embodiments of the method and will not be elaborated here.

Figure 19:
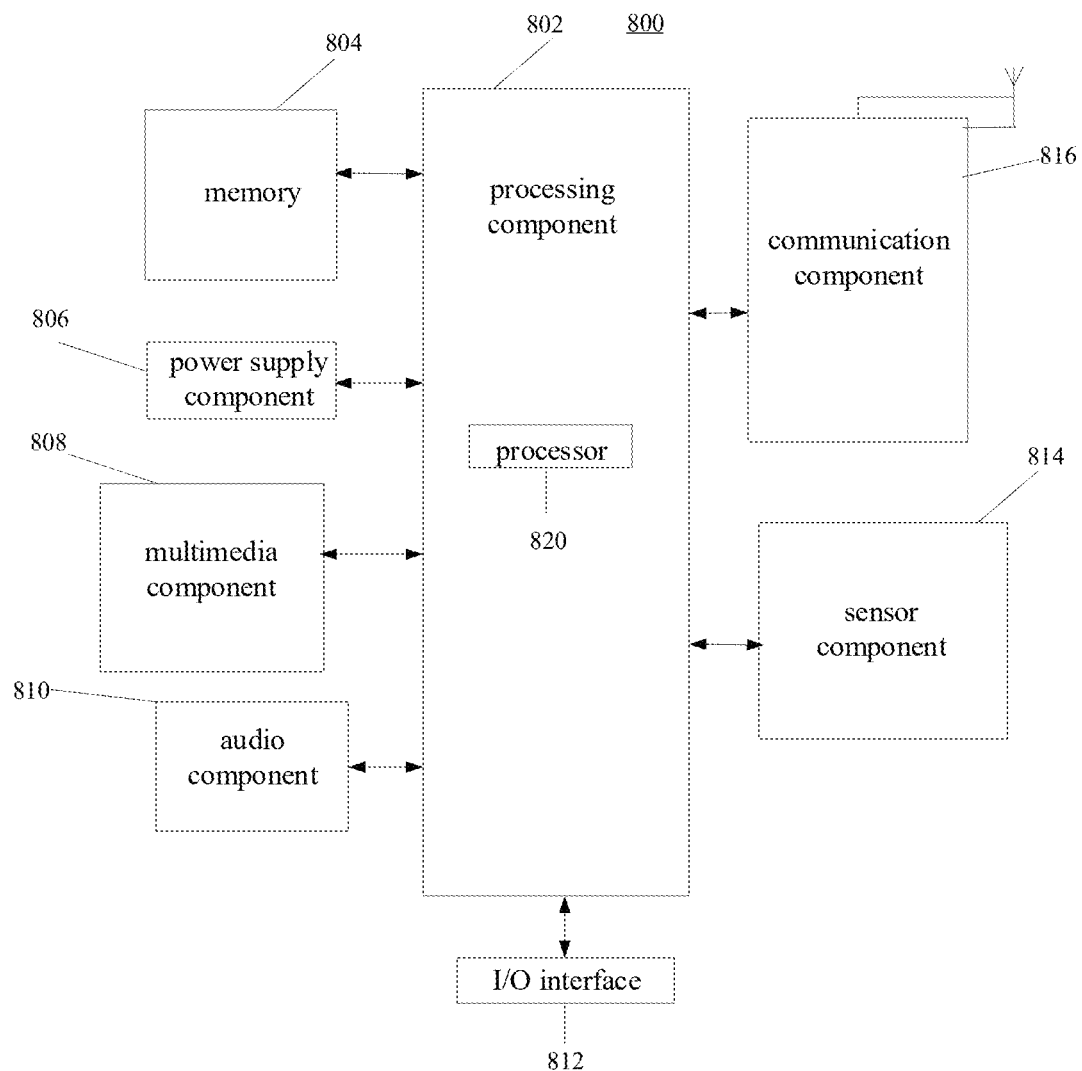
FIG. 19 is a block diagram illustrating a user equipment according to an example embodiment.

FIG. 19 is a block diagram illustrating a user equipment (UE) 800 according to an example embodiment. For example, the UE 800 may be a mobile phone, a computer, a digital broadcasting user equipment, a messaging device, a game console, a tablet device, a medical equipment, a fitness equipment, a personal digital assistant, etc.

As illustrated in FIG. 19, the UE 800 may include one or more components: a processing component 802, a memory 804, a power supply component 806, a multimedia component 808, an audio component 810, an input/output (I/O) interface 812, a sensor component 814, and a communication component 816.

The processing component 802 generally controls the whole operation of the UE 800, such as the operations related to display, phone call, data communication, camera operation and recording operation. The processing component 802 may include one or more processors 820 to perform instructions, to complete all or part of blocks of the above method. In addition, the processing component 802 may include one or more modules for the convenience of interaction between the processing component 802 and other components. For example, the processing component 802 may include a multimedia module for the convenience of interaction between the multimedia component 808 and the processing component 802.

The memory 804 is configured to store all types of data to support the operation of the UE 800. Examples of the data include the instructions of any applications or methods operated on UE 800, contact data, phone book data, messages, pictures, videos, etc. The memory 804 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 806 may provide power for all components of the UE 800. The power supply component 806 may include a power supply management system, one or more power supplies, and other units related to generating, managing and distributing power for the UE 800.

The multimedia component 808 includes an output interface screen provided between the UE 800 and the user. In some embodiments, a screen may include a liquid crystal display (LCD) and a touch panel (TP). When the screen includes a touch panel, the screen may be implemented as a touch screen to receive input signals from the user. The touch panel includes one or more touch sensors to sense touching, sliding and gestures on the touch panel. The touch sensor may not only sense the boundary of touch or slide action, but also detect the duration and pressure related to the touching or sliding operation. In some embodiments, the multimedia component 808 includes a front camera and/or a rear camera. When the UE 800 is in operation mode, such as shooting mode or video mode, the front camera or the rear camera may receive the external multimedia data. Each front camera and rear camera may be a fixed optical lens system or an optical lens system with a focal length and an optical zoom capacity.

The audio component 810 is configured as an output and/or input signal. For example, the audio component 810 includes a microphone (MIC). When the UE 800 is in operation mode, such as call mode, record mode, and speech recognition mode, the microphone is configured to receive the external audio signals. The audio signals received may be further stored in the memory 804 or sent via a communication component 816. In some embodiments, the audio component 810 further includes a speaker configured to output an audio signal.

The I/O interface 812 provides an interface for the processing component 802 and the peripheral interface module, and the peripheral interface module may be a keyboard, a click wheel, a button, etc. The buttons may include but not limited to a home button, a volume button, a start button and a lock button.

The sensor component 814 includes one or more sensors, configured to provide various aspects of status assessment for the UE 800. For example, the sensor component 814 may detect the on/off state of the UE 800 and the relative positioning of the component. For example, the component is a display and a keypad of the UE 800. The sensor component 814 may further detect the location change of the UE 800 or one component of the UE 800, the presence or absence of contact between the user and the UE 800, the orientation or acceleration/deceleration of the UE 800, and the temperature change of the UE 800. The sensor component 814 may include a proximity sensor, which is configured to detect the existence of the objects nearby without any physical contact. The sensor component 814 may further include a light sensor such as CMOS or CCD image sensor, which is configured to use in imaging applications. In some embodiments, the sensor component 814 may further include an acceleration transducer, a gyroscope sensor, a magnetic sensor, a pressure sensor or a temperature sensor.

The communication component 816 is configured for the convenience of wire or wireless communication between the UE 800 and other devices. The UE 800 may access wireless networks based on communication standard, such as WiFi, 2G or 3G, or their combination. In an example embodiment, the communication component 816 receives broadcast signals or broadcast-related information from an external broadcast management system via a broadcast channel. In an exemplary embodiment, the communication component 816 further includes a near field communication (NFC) module to facilitate short-range communication. For example, an NFC module may be implemented based on radio frequency identification (RFID) technology, infrared data association (IRDA) technology, ultra-wideband (UWB) technology, bluetooth (BT) technology and other technologies.

In an example embodiment, the UE 800 may be implemented by one or more application specific integrated circuits(ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method.

In an example embodiment, a non-transitory computer readable storage medium is further provided which includes instructions, such as the memory 804 including instructions, in which the instructions may be executed by the processor 820 of the UE 800 to complete the above methods. For example, the non-transitory computer readable storage medium may be a ROM, a random access memory (RAM), a CD-ROM, a magnetic tape, a floppy disk, an optical data storage device, etc.

Figure 20:
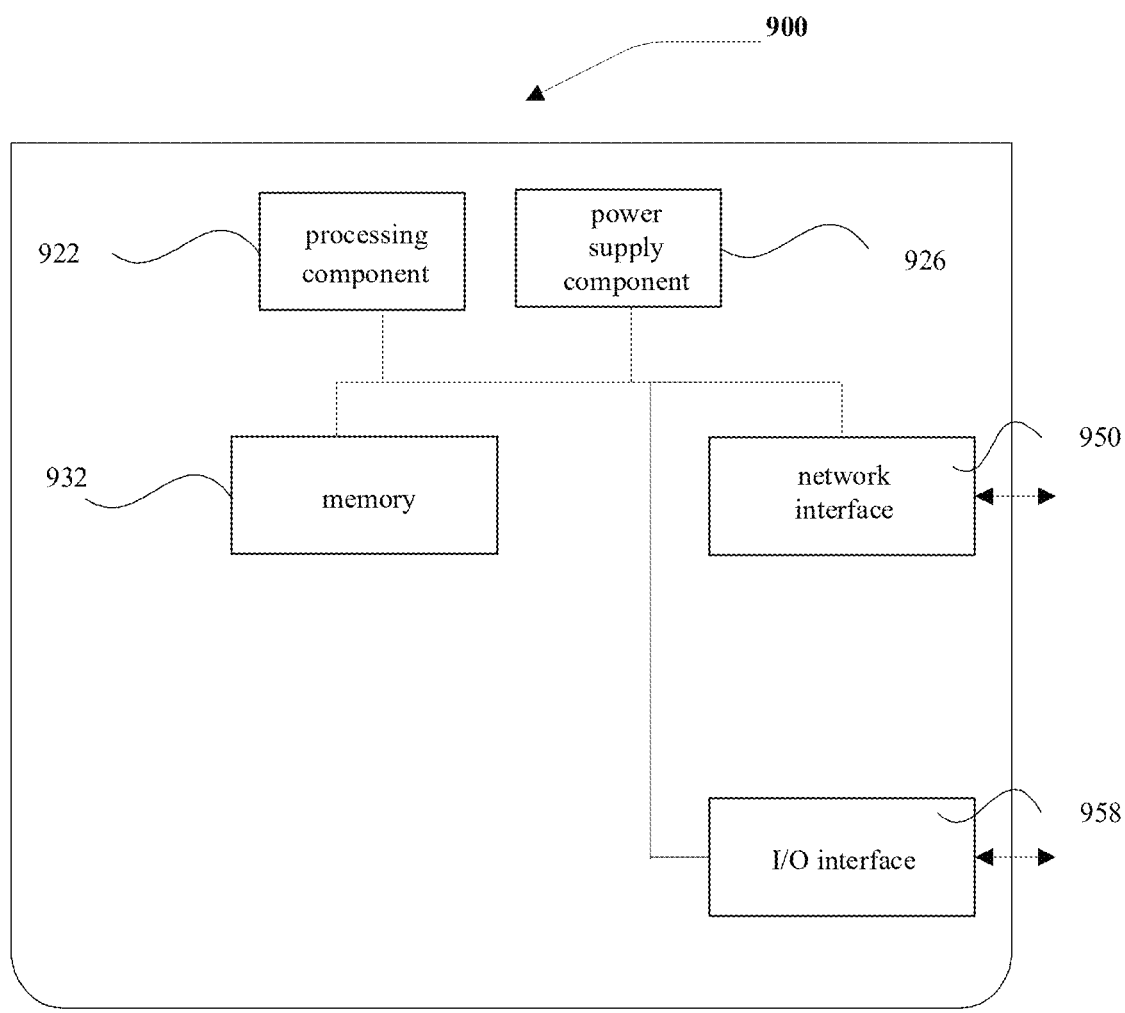
FIG. 20 is a block diagram illustrating a base station according to an example embodiment.

FIG. 20 is a block diagram illustrating a structure of a base station according to one embodiment of the disclosure. For example, the base station 900 may be provided as a network side server. As illustrated in FIG. 20, the base station 900 includes a processing component 922, which further include one or more processors, and memory resources represented by the memory 932, which are configured to store instructions executable by the processing component 922, for example, an application. The application stored in the memory 932 may include one or more modules each of which corresponds to a set of instructions. In addition, the processing component 922 is configured to execute instructions, to execute any one method applied to the base station as described in the above method, for example, the method as illustrated in FIGS. 2 to 6.

The base station 900 may further include one power supply component 926 configured to execute power management of the base station 900, one wired or wireless network interface 950 configured to connect the base station 900 to a network, and one input/output(I/O) interface 958. The base station 900 may operate an operating system stored in the memory 932, for example, Windows Server™, Mac OS X™, Unix™, Linux™, FreeBSD™ or similar.

In some embodiments of the present disclosure, in an unlicensed frequency band scene, two channel detection mechanisms of an independent detection mechanism and a joint detection mechanism are provided for detecting unlicensed channel on a plurality of beams to be detected. In the independent detection mechanism, the channel detection parameter of each of the beams to be detected is independent, and independent channel detection may be performed on each beam to be detected using the corresponding channel detection parameter. In the joint detection mechanism, the plurality of beams to be detected have at least one associated channel detection parameter, and joint channel detection may be performed on each beam to be detected using the corresponding associated channel detection parameter. The above two channel detection mechanisms can meet channel detection requirements in different scenes, and acquire an accurate channel detection result, which provides an accurate reference for channel occupation of a transmitter for data transmission on a plurality of beams to be detected, and reduces interferences to a channel when performing data transmission on a plurality of beams to be detected in an unlicensed scene.

After considering the specification and practicing the disclosure herein, those skilled in the art will easily think of other implementations. The present disclosure is intended to cover any variations, usages, or adaptive changes of the present disclosure. These variations, usages, or adaptive changes follow the general principles of the present disclosure and include common knowledge or conventional technical means in the technical field not disclosed by the present disclosure.

What is claimed is:

1. A method for detecting an unlicensed channel, comprising:
   determining a priority of a channel detection category of a beam based on an area of a signal coverage range of the beam to be detected; and
   performing channel detection for unlicensed channel on a plurality of beams to be detected based on a channel detection mechanism of beams to be detected and based on priorities of channel detection categories of the beams to be detected;
   wherein the channel detection mechanism comprises an independent detection mechanism or a joint detection mechanism, a channel detection parameter of each of the beams to be detected being independent in the independent detection mechanism, and the plurality of beams to be detected having at least one associated channel detection parameter in the joint detection mechanism.

2. The method of claim 1, wherein performing the channel detection for unlicensed channel on the plurality of beams to be detected based on the channel detection mechanism of beams to be detected comprises:
   performing the channel detection for unlicensed channel on each beam to be detected within a predetermined detection time window based on the independent detection mechanism.

3. The method of claim 2, further comprising:
   determining a channel detection category of each of the beams to be detected based on data content to be transmitted on the beam to be detected; wherein, the channel detection category comprises one of: a second category CAT2, a third category CAT3 or a fourth category CAT4;

wherein, performing the channel detection for unlicensed channel on the plurality of beams to be detected, comprises:
performing the channel detection for unlicensed channel on a corresponding beam to be detected based on the determined channel detection category.

4. The method of claim 2, further comprising:
in response to the channel detection on at least two beams to be detected in the plurality of beams to be detected is successful, performing communication through the at least two beams on which the channel detection is successful.

5. The method of claim 4, wherein in response to the channel detection on at least two beams to be detected in the plurality of beams to be detected is successful, performing communication through the at least two beams on which the channel detection is successful, comprises:
in response to the channel detection on the at least two beams to be detected in the plurality of beams to be detected within the detection time window is successful, performing communication through the at least two beams on which the channel detection is successful at an end position of the detection time window or any position after the end position of the detection time window.

6. The method of claim 4, wherein start positions and/or end positions of channel occupation time for the communication through the at least two beams on which the channel detection is successful are the same;
or,
the start positions and/or the end positions of the channel occupation time for the communication through the at least two beams on which the channel detection is successful are different.

7. The method of claim 2, further comprising:
in response to the channel detection on at least one beam to be detected in the plurality of beams to be detected is successful and the channel detection on at least one other beam is failed, performing communication through the at least one beam on which the channel detection is successful and contingently performing the channel detection on the at least one other beam on which the channel detection fails.

8. The method of claim 7, wherein contingently performing the channel detection on the at least one other beam on which the channel detection is failed, comprises:
determining a data receiving period of the at least one beam on which the channel detection is successful, and contingently performing the channel detection in the data receiving period on the at least one other beam on which the channel detection fails.

9. The method of claim 2, further comprising:
in response to the channel detection on at least one beam to be detected in the plurality of beams to be detected is successful and the channel detection on at least one other beam is failed, contingently performing the channel detection on the at least one other beam on which the channel detection fails.

10. The method of claim 2, further comprising:
in response to the channel detection on at least one beam to be detected in the plurality of beams to be detected is successful and the channel detection on at least one other beam is failed, contingently performing the channel detection on the at least one other beam on which the channel detection is failed; and performing communication through at least two beams to be detected until the channel detection is successful on the at least two beams to be detected.

11. The method of claim 1, wherein the associated channel detection parameter comprises: a detection priority of each of the beams to be detected;
performing the channel detection for unlicensed channel on the plurality of beams to be detected based on the channel detection mechanism of beams to be detected, comprises:
performing the channel detection for unlicensed channel on each of the beams to be detected sequentially according to the detection priorities from low to high based on the joint detection mechanism.

12. The method of claim 11, wherein, performing the channel detection for unlicensed channel on each of the beams to be detected sequentially, comprises:
in response to the unlicensed channel being detected idle on a previously detected beam, contingently performing the channel detection for unlicensed channel on an undetected beam to be detected.

13. The method of claim 12, wherein, performing the channel detection for unlicensed channel on the undetected beam to be detected, comprises:
performing the channel detection for unlicensed channel by different channel detection categories on different undetected beams to be detected; wherein, the channel detection category comprises one of: a second category CAT2, a third category CAT3 or a fourth category CAT4.

14. A communication device, comprising:
an antenna;
a memory; and
a processor, connected to the antenna and the memory respectively, configured to determine a priority of a channel detection category of a beam based on an area of a signal coverage range of the beam to be detected; and
perform a channel detection for unlicensed channel on a plurality of beams to be detected based on a channel detection mechanism of beams to be detected based on priorities of channel detection categories of the beams to be detected;
wherein, the channel detection mechanism comprises an independent detection mechanism or a joint detection mechanism, a channel detection parameter of each of the beams to be detected being independent in the independent detection mechanism, and the plurality of beams to be detected having at least one associated channel detection parameter in the joint detection mechanism.

15. A non-transitory computer storage medium stored with computer executable instructions, wherein the computer executable instructions are configured to implement a method for detecting an unlicensed channel when executed by a processor, the method comprising:
determining a priority of a channel detection category of a beam based on an area of a signal coverage range of the beam to be detected; and
performing channel detection for unlicensed channel on a plurality of beams to be detected based on a channel detection mechanism of beams to be detected based on priorities of channel detection categories of the beams to be detected;
wherein, the channel detection mechanism comprises an independent detection mechanism or a joint detection mechanism, a channel detection parameter of each of the beams to be detected being independent in the independent detection mechanism, and the plurality of beams to be detected having at least one associated channel detection parameter in the joint detection mechanism.

16. The communication device of claim 14, wherein the processor is further configured to:
   determine a channel detection category of each of the beams to be detected based on data content to be transmitted on the beam to be detected; wherein, the channel detection category comprises one of: a second category CAT2, a third category CAT3 or a fourth category CAT4; and
   perform the channel detection for unlicensed channel on a corresponding beam to be detected based on the determined channel detection category.

17. The communication device of claim 16, wherein the processor is further configured to:
   in response to the channel detection on at least two beams to be detected in the plurality of beams to be detected is successful, perform communication through the at least two beams on which the channel detection is successful.

18. The communication device of claim 16, wherein the processor is further configured to:
   in response to the channel detection on at least one beam to be detected in the plurality of beams to be detected is successful and the channel detection on at least one other beam is failed, perform communication through the at least one beam on which the channel detection is successful and contingently perform the channel detection on the at least one other beam on which the channel detection fails.

19. The communication device of claim 16, wherein the processor is further configured to:
   in response to the channel detection on at least one beam to be detected in the plurality of beams to be detected is successful and the channel detection on at least one other beam is failed, contingently perform the channel detection on the at least one other beam on which the channel detection is failed; and perform communication on the at least two beams to be detected until the channel detection is successful on the at least two beams to be detected.

* * * * *